United States Patent
Sakamoto et al.

(10) Patent No.: US 8,532,491 B2
(45) Date of Patent: Sep. 10, 2013

(54) OPTICAL MULTIPLEXING TERMINATING DEVICE, PASSIVE OPTICAL NETWORK SYSTEM AND METHOD FOR ALLOCATING WAVELENGTH

(75) Inventors: Norihiro Sakamoto, Chigasaki (JP); Tohru Kazawa, Kokubunji (JP); Yusuke Yajima, Fujisawa (JP); Akihiko Tsuchiya, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 82 days.

(21) Appl. No.: 13/262,754

(22) PCT Filed: Apr. 7, 2009

(86) PCT No.: PCT/JP2009/057096
§ 371 (c)(1),
(2), (4) Date: Dec. 20, 2011

(87) PCT Pub. No.: WO2010/116487
PCT Pub. Date: Oct. 14, 2010

(65) Prior Publication Data
US 2012/0106958 A1 May 3, 2012

(51) Int. Cl.
*H04J 14/00* (2006.01)

(52) U.S. Cl.
USPC ............ 398/72; 398/58; 398/68; 398/69; 398/70; 398/71; 398/75; 398/98; 398/99; 398/100; 370/468; 370/352; 370/392; 370/395.4; 370/230; 370/390; 370/235

(58) Field of Classification Search
USPC .......... 398/58, 66, 67, 68, 69, 70, 71, 72, 398/75, 79, 98, 99, 100, 25; 370/468, 352, 370/390, 392, 395.4, 389, 230, 235, 442, 370/465
See application file for complete search history.

(56) References Cited

U.S. PATENT DOCUMENTS

| 7,725,031 B2 * | 5/2010 | Kazawa et al. | 398/71 |
| 7,873,277 B2 * | 1/2011 | Kazawa et al. | 398/68 |
| 2006/0120724 A1 | 6/2006 | Ishimura | |

FOREIGN PATENT DOCUMENTS

| JP | 2005-348311 A | 12/2005 |
| JP | 2006-165953 A | 6/2006 |

OTHER PUBLICATIONS

PCT International Preliminary Report on Patentability on application PCT/JP2009/057096 dated Feb. 14, 2012; 6 pages.
Gigabit-capable Passive Optical Networks (GPON): General characteristics; ITU-T Recommendation; G.984.1 (Mar. 2003); pp. i-iii, 1-14.
Gigabit-capable Passive Optical Networks (GPON): Physical Media Dependent (PMD) layer specification; ITU-T Recommendation; G.984.2 (Mar. 2003); pp. i-iii, 1-29.

(Continued)

*Primary Examiner* — Hanh Phan
(74) *Attorney, Agent, or Firm* — Foley & Lardner LLP

(57) ABSTRACT

A passive optical network system such that the power consumption can be reduced as much as possible according to the end-user traffic. An OLT uses the DBA function thereof and sequentially uses frequencies in ascending order of transmission rate in order to sequentially allocate bands to ONUs in ascending order of the requested bandwidth. At this time, a frequency to be allocated is selected so that the bandwidth allocated to each ONU is narrower than a maximum bandwidth through which transmission using the allocated wavelength is enabled. An OLT uses a grant area to specify the transmission timing of the secondary station and to inform the specified transmission timing to the secondary station. In addition, an area is set for storing information used to inform the secondary station of a new frequency to be used.

6 Claims, 19 Drawing Sheets

(56) References Cited

OTHER PUBLICATIONS

Gigabit-capable Passive Optical Networks (GPON): Transmission convergence layer specification; ITU-T Recommendation; G.984.3 (Feb. 2004); pp. i-iv, 1-107.

Gigabit-capable Passive Optical Networks (GPON): Physical Media Dependent (PMD) layer specification; Amendment 1: New Appendix III—Industry best practice for 2.488 Gbit/s downstream; 1.244 Gbit/s upstream G-PON; ITU-T Recommendation; G.984.2 (2003)—Amendment 1; pp. i-iv, 1-3.

* cited by examiner

| TCONT-ID | ALLOCATED BYTE LENGTH |
|---|---|
| 1 | 486 (bandwidth 30Mbit/s equivalent (correctly 31.104Mbit/s)) |
| 2 | 11340 (bandwidth 700Mbit/s equivalent (correctly 725.76Mbit/s)) |
| 3 | 32400 (bandwidth 2Gbit/s equivalent (correctly 2073.6Mbit/s)) |
| 4 | 12960 (bandwidth 800Mbit/s equivalent (correctly 829.44Mbit/s)) |
| 5 | 1458 (bandwidth 90Mbit/s equivalent (correctly 93.3120Mbit/s)) |

Fig. 10

OPTICAL MULTIPLEXING TERMINATING DEVICE, PASSIVE OPTICAL NETWORK SYSTEM AND METHOD FOR ALLOCATING WAVELENGTH

TECHNICAL FIELD

The present invention relates to an optical multiplexing terminating device, a passive optical network system and a method for allocating wavelength, and more particularly to an optical multiplexing terminating device in a passive optical network system in which plural optical network terminating devices such as subscriber connecting devices share an optical transmission line, the passive optical network system and a method for allocating wavelength

BACKGROUND ART

To transmit and receive a large volume of image signal or data via a communication network, the higher speed and wider bandwidth of the communication network have been carried out in an access network for connecting the subscriber to the communication network, whereby a Passive Optical Network system (hereinafter referred to as a PON) has been introduced as defined in the recommendation G.987.1-3 of the International Telecommunication Union (hereinafter referred to as ITU-T). The PON is a system in which an Optical Line Terminator (hereinafter referred to as an OLT) connected to an upper-level communication network and an Optical Network Unit (hereinafter referred to as an ONU) accommodating plural subscriber terminals (PCs or telephones) are connected via an optical passive network including a trunk optical fiber, an optical splitter and plural branch optical fibers. Specifically, in a communication form, a signal from the terminal (PC or the like) connected to each ONU, or an optical signal, is passed from the branch optical fiber via the optical splitter to the trunk optical fiber for optical (time division) multiplexing and sent to the OLT, and the OLT performs a communication process for the signal from each ONU and transmits the signal to the upper-level communication network, or the other ONU connected to the OLT.

The development and introduction of the PONs have been made including a system dealing with the low speed signal of 64 kbit/sec, a Broadband PON (BPON) for transmitting and receiving the ATM cell of fixed length at the maximum rate of about 600 Mbit/sec, an Ethernet PON (EPON) for transmitting and receiving the variable length packet of Ethernet (registered trademark) at the maximum rate of about 1 Gbit/sec, and a Gigabit PON (GPON) dealing with the faster signal of about 2.4 Gbit/sec, as standardized in the ITU-T recommendations G.984.1, G.984.2 and G.984.3. Further, the implementation of the fast PON capable of dealing with the signal from 10 Gbit/sec to 40 Gbit/sec will be sought in the future. As means for implementing these fast PONs, the multiplexing methods for plural signals such as Time Division Multiplexing (TDM) for making the time division multiplexing, Wavelength Division Multiplexing (WDM) for making the wavelength division multiplexing, and Code Division Multiplexing (CDM) for making the code division multiplexing have been investigated. The current PON adopts the TDM, and the GPON, for example, uses different wavelengths for the uplink (from ONU to OLT) signal and the downlink (from OLT to ONU) signal, in which the communication between the OLT and each ONU is configured to allocate the communication time of signal to each ONU. Also, the conventional configuration of dealing with the fixed length signal has changed to the configuration of dealing with the burst, variable length signal (burst signal) easy to handle more various types of signals (voice, image, data and so on).

On the other hand, in a WDM method, plural waves having different wavelengths for both the uplink signal and the downlink signal are connected between the OLT and the ONU, and each ONU receives and transmits a specific wavelength to make the communication. By allocating an individual wavelength from the OLT to each ONU to make the communication, the communication band can be remarkably improved. For example, one implementation method for a WDM-PON capable of connecting a maximum of 32 ONUs is that M downlink wavelengths (one wavelength for each of uplink and downlink is allocated to each ONU for 32 wavelengths) are allocated, that is, the number of wavelengths for use in one PON is made double the maximum number of connected ONUs. Herein, in the WDM-PON capable of connecting a maximum of 32 ONUs, following the idea of the conventional TDM-PON, there is an idea that the PON is economically constructed by limiting the number of uplink wavelengths to n (32 wavelengths or less) to reduce the number of expensive optical components. The downlink signal has high possibility that the user asks for the large transmission capacity due to diffusion of high quality video distribution, whereas the uplink signal is used for a file upload signal at the time of internet access and has less possibility of using the large capacity at any time. At this time, the uplink signal is transmitted by making the time division multiplexing of the transmit signals from the plural ONUs, whereby it should be noticed that a ranging procedure or the dynamic bandwidth assignment as will be described later is required in the WDM-PON.

In the above form of each PON, the distance from the OLT to each ONU is different to install the ONUs in the subscriber houses scattered at various locations. That is, since the length of optical fiber (transmission distance) including the trunk optical fiber and the branch optical fiber from the OLT to each ONU varies, the transmission delay (delay amount) between each ONU and the OLT varies, whereby even if each ONU transmits the signal at different timing, there is possibility that the optical signals outputted from the ONUs may collide and interfere on the trunk optical fiber. Therefore, in each PON, the distance between the OLT and the ONU is measured, using a technique called the ranging as defined in chapter 10 of G.984.3, for example, and then the delay of output signal from each ONU is adjusted so that the signals outputted from the ONUs may not collide.

Further, using a technique called the Dynamic Bandwidth Assignment (hereinafter referred to as DBA), the OLT decides the band of signal permitted to transmit to the ONU, based on a transmission request from each ONU, and in consideration of the delay amount measured by the above ranging, specifies the transmission timing to each ONU so that the optical signals from the ONUs may not collide and interfere on the trunk optical fiber. That is, the PON is configured to operate the communication in the state where the timing of signal transmitted and received between the OLT and each ONU is managed within the system.

In transmitting and receiving the signal between the OLT and each ONU, the signal from the ONU to the OLT has a guard time for prevention of interference having a maximum of 12 bytes at the top of the signal from each ONU, a preamble for use to decide the signal identification threshold of a receiver within the OLT and extract the clock, a burst overhead byte called a delimiter for identifying the breakpoint of the received signal, and a control signal (sometimes called an overhead or header) of the PON, which are added to the data (sometimes called a payload), so that the OLT can identify and process the signal from each ONU multiplexed on the trunk optical fiber, as defined in chapter 8.3.3 of G.984.2, for example. Since each data is burst data of variable length, a header called a GEM (G-PON Encapsulation method) header for processing the variable length data is also added to the top of each data.

On the other hand, the signal from the OLT to each ONU has a frame alignment pattern for identifying the top, a PLOAM area for transmitting the monitor, maintenance and control information, and an overhead (sometimes called a header) called a grant indication area for indicating the signal transmission timing of each ONU, which are added to the time division multiplexed data addressed to each ONU, at the top of the signal transmitted from the OLT to each ONU, so that each ONU can identify and process the signal from the OLT. A GEM header for processing the variable length data is added to the data addressed to each ONU that is multiplexed, like the signal from the ONU. The OLT specifies the uplink transmission permission timing (transmission start (Start) and end (Stop)) of each ONU in bytes to each ONU, using the grant indication area. This transmission permission timing is called the grant. And if each ONU transmits the data addressed to the OLT at the permission timing, these are optically (time division) multiplexed on the optical fiber, and received by the OLT.

Prior Art Documents
Non-Patent Documents
   Non-patent document 1: ITU-T recommendation G.984.1
   Non-patent document 2: ITU-T recommendation G.984.2
   Non-patent document 3: ITU-T recommendation G.984.3
   Non-patent document 4: ITU-T recommendation G.984.2 Amendment 1

DISCLOSURE OF THE INVENTION

Problems that the Invention is to Solve

As described above, the development and introduction of the PON have been made from the one processing the low speed signal to the one processing the high speed signal as in the transition from the BPON to the GPON. By the way, it is well known that an optical module or LSI that is an element component for providing a signal transmission function of the PON consumes larger power as the transmission rate is higher. For example, the optical module tends to reserve the required bandwidth by passing a larger amount of current at higher transmission rate to attain the higher transmission rate. Also, it is well known that a digital signal processing LSI with the CMOS technology consumes the power almost proportional to the rate of clock for use. From the above circumstances, it is easily foreseen in the future that a larger consumption power tends to be spent as the transmission rate is higher. On the other hand, even though there is tendency that the end user asks for the higher transmission rate, the end user does not always want the high transmission rate. In a time period when the communication is not performed, of course, the high transmission rate is not required, but during the communication, especially in the data transmission on the internet access, it is natural that the high transmission rate is demanded only at the moment of downloading or uploading a large volume of image data or a large file, but the high transmission rate is not required during the perusal of the content or execution of work. Also, in a TCP protocol for use in the data transmission, if a certain number of packets are received, it is required to return a validation signal packet, whereby on the data transmission side, the subsequent data is not transmitted until the validation signal packet is received. As a conclusion, it is apparent that the data traffic is in the form of the quite high burst transmission even during the data transmission. Nevertheless, the optical module or LSI composing the PON device is operative even in the time period when data is not substantially transmitted to consume the power, causing a remarkable waste of power. Therefore, there is a demand for the PON system in which when the end user traffic is small, the transmission is performed at low transmission rate, while when the end user traffic is large, the transmission is performed at high transmission rate.

In the light of the above-mentioned problems, an object of the invention is to provide an optical multiplexing terminating device, a passive optical network system and a method for allocating wavelength in which a waste of power consumption can be reduced as much as possible, based on the end user traffic.

Means for Solving the Problems

The above problems can be solved by making the uplink signal communication using a different transmission rate (transmission clock rate) for each wavelength in the uplink signal of the WDM-PON in which the number of uplink wavelengths is limited to n (32 wavelengths or less) as described above and using the wavelength of small transmission rate in the uplink signal of the ONU with small requested bandwidth.

More specifically, the OLT allocates bands to ONUs in ascending order of the requested bandwidth, using a DBA function thereof and sequentially using the wavelengths in ascending order of transmission rate. At this time, the wavelength to be allocated must be selected so that the bandwidth allocated to each ONU is narrower than a maximum bandwidth through which transmission is enabled at the allocated wavelength. For example, using four uplink wavelengths, the transmission rates for use at those wavelengths are such that wavelength 1=100 Mbit/s, wavelength 2=500 Mbit/s, wavelength 3=1 Gbit/s, and wavelength 4=10 Gbit/s in order. Herein, when the bandwidth of 600 Mbit/s is allocated to a certain ONU, the wavelength 1 or 2 is not used even if there is a margin of bandwidth allocation in the wavelength 1 or 2, but the wavelength of wavelength 3=1 Gbit must be selected as the allocation wavelength.

There is the following reason for this. In the case where the ONU has one wavelength variable laser and operates by selecting the wavelength based on an instruction from the OLT, the wavelength variable laser can only emit the light of one wavelength at a time. If an attempt is made to use the two wavelengths of wavelength 1=100 Mbit/s and wavelength 2=500 Mbit/s in the above example, the wavelength variable laser is sought to emit the lights of wavelengths 1 and 2 at the same time, whereby this attempt is not realized in principle. In other words, a total of assignable bandwidth is 600 Mbit/s in the above example, and supposedly, the bandwidth assignment is possible, but because of a restriction that "the wavelength variable laser can only emit the light of one wavelength at a time" as already described, it is not possible to realize the transmission of 600 Mbit/s.

The above restriction does not interfere with the use of two wavelengths in time division for one ONU in the follow way. At this time, an instance of allocating the wavelengths 3 and 4 in time division to the ONU having a bandwidth request of 1 Gbit/s is considered. Specifically, information of 500 Mbit/s is transmitted in the latter half of the DBA period using the wavelength 3. Further, information of 500 Mbit/s is transmitted in the former one-twentieth of the DBA period using the wavelength 4 (corresponding to the bandwidth of 10 Gbit/s).

For this wavelength allocation in time division, it is unnecessary that the wavelength variable laser emits the lights of wavelengths 3 and 4 at the same time. This wavelength allocation in time division can be realized in good visibility by allocating bands to the ONUs in ascending order of the requested bandwidth, sequentially using wavelengths in ascending order of transmission rate, as described above.

Subsequently, a method of specifying the operating wavelength from the OLT to the ONU will be described below. Though the OLT, by using the DBA function, uses the grant area as described above to specify the transmission timing of the child station and to inform the specified transmission timing to the child station, an area is set for storing information used to inform the child station of a new operating wavelength to be used in addition to the area where this grant information is stored. Each ONU carries out uplink communication using the specified wavelength from the OLT at a transmission rate determined at that wavelength. When the ONU makes the communication at lower transmission rate, the optical module for low rate is used and the clock frequency to be supplied to the uplink signal processing part of the LSI is decreased, whereby the power consumption of the ONU is reduced.

According to the invention, there is provided a wavelength multiplexing passive optical network system including a parent station and plural child stations that are connected via an optical fiber network composed of an optical splitter and plural optical fibers, in which the communication from the parent station to the child station is made using a different wavelength allocated for each child station, and the communication from the child station to the parent station is made using a smaller number of wavelengths than the total number of child stations connected to the parent station, wherein each wavelength operates at a different transmission rate, for example.

The parent station may include a bandwidth control part for deciding the amount of signal permitted for each child station to transmit at a fixed period based on a request from the plural child stations, and a transmission timing control part for deciding the transmission timing and the operating wavelength of the child station for transmitting the signal based on the decided amount of signal.

The transmission timing control part may specify the operating wavelength in addition to the transmission timing of the child station to the child station.

In a signal transmission format from the parent station to the child station, an area is set for storing the transmission timing of the child station that the transmission timing control part specifies to the child station, and an area is set for specifying the wavelength for use in the communication from the child station to the parent station.

The bandwidth control part decides the amount of signal that each of the child stations is permitted to transmit at a certain period with a total of transmission rates corresponding to the plural wavelengths for use in the communication from the child station to the parent station as the upper limit, and the transmission timing control part can allocate the transmission timing to the child stations in ascending order of the amount of signal permitted to transmit decided by the bandwidth control part by selecting the wavelength in which the corresponding transmission rate is slowest from among the wavelengths for which the bandwidth assignment is not completed.

The transmission timing control part compares the amount of signal permitted to transmit decided by the bandwidth control part with a maximum signal amount that can be transmitted at the transmission rate corresponding to the wavelength at each fixed period, and can allocate the transmission timing using the wavelength used for the comparison, only if the amount of signal permitted to transmit is not above the maximum signal amount that can be transmitted.

According to the first solving means of the present invention, there is provided an optical multiplexing terminating device in a passive optical network system in which the optical multiplexing terminating device connected to an upper-level communication network and a plurality of optical network terminating devices for accommodating the subscriber terminals are connected via an optical fiber network having an optical splitter and a plurality of optical fibers, the communication from said optical multiplexing terminating device to said optical network terminating device being made using a different wavelength allocated for said each optical network terminating device, and the communication from said optical network terminating device to said optical multiplexing terminating device being made using plural wavelengths of a smaller number than the total number of said optical network terminating devices connected to said optical multiplexing terminating device and operable in plural different time slot lengths, said optical multiplexing terminating device comprising:

a transmission timing table for storing, for each optical network terminating device ID, a type of uplink wavelength, a start position of transmission time slot, and an end position of transmission time slot;

an allocated byte length table for storing, for each optical network terminating device ID, an allocated byte length indicating data amount permitted to transmit; and a control part for allocating the type of uplink wavelength and the transmission time slot to each optical network terminating device by referring to said transmission timing table and said allocated byte length table;

wherein said control part rearranges in ascending order of allocated byte length for each optical network terminating device ID by referring to said allocated byte length table, and determines order of processes;

selects the type of uplink wavelength in ascending order of time slot length corresponding to the wavelength, for the optical network terminating device ID in ascending order of the order of processes by referring to said allocated byte length table;

compares the time slot length corresponding to the selected type of uplink wavelength with the allocated byte length of the optical network terminating device ID read from said allocated byte length table;

allocates the type of wavelength as a first wavelength type, if the time slot length of the selected type of wavelength is greater than the allocated byte length of the optical network terminating device ID, while on the other hand, allocates the wavelength of which the time slot length is greater than the time slot length of the selected type of wavelength and the time slot length is greater than the allocated byte length of the optical network terminating device ID, as a first wavelength type, if the time slot length of the selected type of wavelength is smaller than the allocated byte length of the optical network terminating device ID;

if all of the allocated byte lengths are allocated within the time slot length in which the transmission time slot is not allocated with the first wavelength type, sets a start position and an end position of transmission time slot, and stores the start position and the end position along with the first uplink wavelength type in said transmission timing table associated with the optical network terminating device ID; and on the other hand, if all of the allocated byte lengths are not allocated within the time slot length in which the transmission time slot is not allocated with the first wavelength type, allocates part of the allocated byte length which can be allocated within the time slot length of the first uplink wavelength type, sets a start position and an end position of the transmission time slot, and stores the start position and the end position along with the first uplink wavelength type in said transmission timing table associated with the optical network terminating device ID, and further, within a time slot length of a second wavelength type of which the time slot length is next greater than the time slot length of the first uplink wavelength type and transmission time slot is not yet allocated, allocates the remaining allocated byte length, sets a start position and an end position of transmission time slot, and stores the start position and the end position along with the second uplink wavelength type in said transmission timing table associated with the optical network terminating device ID.

According to the second solving means of the present invention, there is provided a passive optical network system in which an optical multiplexing terminating device connected to an upper-level communication network and a plurality of optical network terminating devices for accommodating the subscriber terminals are connected via an optical fiber network having an optical splitter and a plurality of optical fibers, the communication from said optical multiplexing terminating device to said optical network terminating device being made using a different wavelength allocated for said each optical network terminating device, and the communication from said optical network terminating device to said optical multiplexing terminating device being made using plural wavelengths of in a smaller number than the total number of said optical network terminating devices connected to said optical multiplexing terminating device and operable in plural different time slot lengths, said optical multiplexing terminating device comprising:

a transmission timing table for storing, for each optical network terminating device ID, a type of uplink wavelength, a start position of transmission time slot, and an end position of transmission time slot;

an allocated byte length table for storing, for each optical network terminating device ID, an allocated byte length indicating data amount permitted to transmit; and a control part for allocating the type of uplink wavelength and the transmission time slot to each optical network terminating device by referring to said transmission timing table and said allocated byte length table;

wherein said control part rearranges in ascending order of allocated byte length for each optical network terminating device ID by referring to said allocated byte length table, and determines order of processes;

selects the type of uplink wavelength in ascending order of time slot length corresponding to the wavelength, for the optical network terminating device ID in ascending order of the order of processes by referring to said allocated byte length table;

compares the time slot length corresponding to the selected type of uplink wavelength with the allocated byte length of the optical network terminating device ID read from said allocated byte length table;

allocates the type of wavelength as a first wavelength type, if the time slot length of the selected type of wavelength is greater than the allocated byte length of the optical network terminating device ID, while on the other hand, allocates the wavelength of which the time slot length is greater than the time slot length of the selected type of wavelength and the time slot length is greater than the allocated byte length of the optical network terminating device ID, as a first wavelength type, if the time slot length of the selected type of wavelength is smaller than the allocated byte length of the optical network terminating device ID;

if all of the allocated byte lengths are allocated within the time slot length in which the transmission time slot is not allocated with the first wavelength type, sets a start position and an end position of transmission time slot, and stores the start position and the end position along with the first uplink wavelength type in said transmission timing table associated with the optical network terminating device ID; and on the other hand, if all of the allocated byte lengths are not allocated within the time slot length in which the transmission time slot is not allocated with the first wavelength type, allocates part of the allocate byte length which can be allocated within the time slot length of the first uplink wavelength type, sets a start position and an end position of the transmission time slot, and stores the start position and the end position along with the first uplink wavelength type in said transmission timing table associated with the optical network terminating device ID, and further, within a time slot length of a second wavelength type of which the time slot length is next greater than the time slot length of the first uplink wavelength type and transmission time slot is not yet allocated, allocates the remaining allocated byte length, sets a start position and an end position of transmission time slot, and stores the start position and the end position along with the second uplink wavelength type in said transmission timing table associated with the optical network terminating device ID.

According to the third solving means of the present invention, there is provided a method for allocating wavelength in a passive optical network system in which an optical multiplexing terminating device connected to an upper-level communication network and a plurality of optical network terminating devices for accommodating the subscriber terminals are connected via an optical fiber network having an optical splitter and a plurality of optical fibers, the communication from said optical multiplexing terminating device to said optical network terminating device being made using a different wavelength allocated for said each optical network terminating device, and the communication from said optical network terminating device to said optical multiplexing terminating device being made using plural wavelengths of a smaller number than the total number of said optical network terminating devices connected to said optical multiplexing terminating device and operable in plural different time slot lengths, said optical multiplexing terminating device comprising:

a transmission timing table for storing, for each optical network terminating device ID, a type of uplink wavelength, a start position of transmission time slot, and an end position of transmission time slot;

an allocated byte length table for storing, for each optical network terminating device ID, an allocated byte length indicating data amount permitted to transmit; and a control part for allocating the type of uplink wavelength and the transmission time slot to each optical network terminating device by referring to said transmission timing table and said allocated byte length table;

wherein said control part rearranges in ascending order of allocated byte length for each optical network terminating device ID by referring to said allocated byte length table, and determines order of processes;

selects the type of uplink wavelength in ascending order of time slot length corresponding to the wavelength, for the optical network terminating device ID in ascending order of the order of processes by referring to said allocated byte length table;

compares the time slot length corresponding to the selected type of uplink wavelength with the allocated byte length of the optical network terminating device ID read from said allocated byte length table;

allocates the type of wavelength as a first wavelength type, if the time slot length of the selected type of wavelength is greater than the allocated byte length of the optical network terminating device ID, while on the other hand, allocates the wavelength of which the time slot length is greater than the time slot length of the selected type of wavelength and the time slot length is greater than the allocated byte length of the optical network terminating device ID, as a first wavelength type, if the time slot length of the selected type of wavelength is smaller than the allocated byte length of the optical network terminating device ID;

if all of the allocated byte lengths are allocated within the time slot length in which the transmission time slot is not allocated with the first wavelength type, sets a start position and an end position of transmission time slot, and stores the start position and the end position along with the first uplink wavelength type in said transmission timing table associated with the optical network terminating device ID; and on the other hand, if all of the allocated byte lengths are not allocated within the time slot length in which the transmission time slot is not allocated with the first wavelength type, allocates part of the allocate byte length which can be allocated within the time slot length of the first uplink wavelength type, sets a start position and an end position of the transmission time slot, and stores the start position and the end position along with the first uplink wavelength type in said transmission timing table associated with the optical network terminating device ID, and further, within a time slot length of a second wavelength type of which the time slot length is next greater than the time slot length of the first uplink wavelength type and transmission time slot is not yet allocated, allocates the remaining allocated byte length, sets a start position and an end position of transmission time slot, and stores the start position and the end position along with the second uplink wavelength type in said transmission timing table associated with the optical network terminating device ID.

Effects of the Invention

With the invention, it is possible to provide the optical multiplexing terminating device, the passive optical network system and the method for allocating wavelength that a waste of power consumption can be reduced as much as possible, based on the end user traffic.

BRIEF DESCRIPTION OF THE DRAWINGS

FIG. 10 is a memory organization view showing an organization example of an allocated byte length table.

BEST MODE FOR CARRYING OUT THE INVENTION

The configuration and operation of a PON according to this embodiment and a method for allocating wavelength for implementing this means will be described below in detail using the drawings.

1. Passive Optical Network System

In the following explanation, an PON configured to make the wavelength division multiplexing of data by allocating wavelength to each of five ONUs connected to an OLT is supposed, in which the wavelength allocated to downlink data from the OLT to each ONU is one of allocating statically a unique wavelength ($\lambda d1, \lambda d2, \ldots, \lambda d5$) to each of the ONUs, and the wavelength allocated to uplink data from the ONU to the OLT is one of dynamically allocating the wavelengths ($\lambda u1, \lambda u2, \lambda u3, \lambda u4$) capable of transmitting data of 100 Mbit/s (correctly 103.68 Mbit/s and the length of time slot is 1620 bytes), 500 Mbit/s (correctly 518.4 Mbit/s and the length of time slot is 8100 bytes), 1 Gbit/s (correctly 1036.8 Mbit/s and the length of time slot is 16200 bytes), and 10 Gbit/s (correctly 10368 Mbit/s and the length of time slot is 162000 bytes). These numerical values are one example, and other transmission rates may be used, whereby this embodiment is not limited to these numerical examples. Also, four or more uplink wavelengths and five or more ONUs may be provided, or three or less uplink wavelengths and four or less ONUs may be provided.

Figure 1:
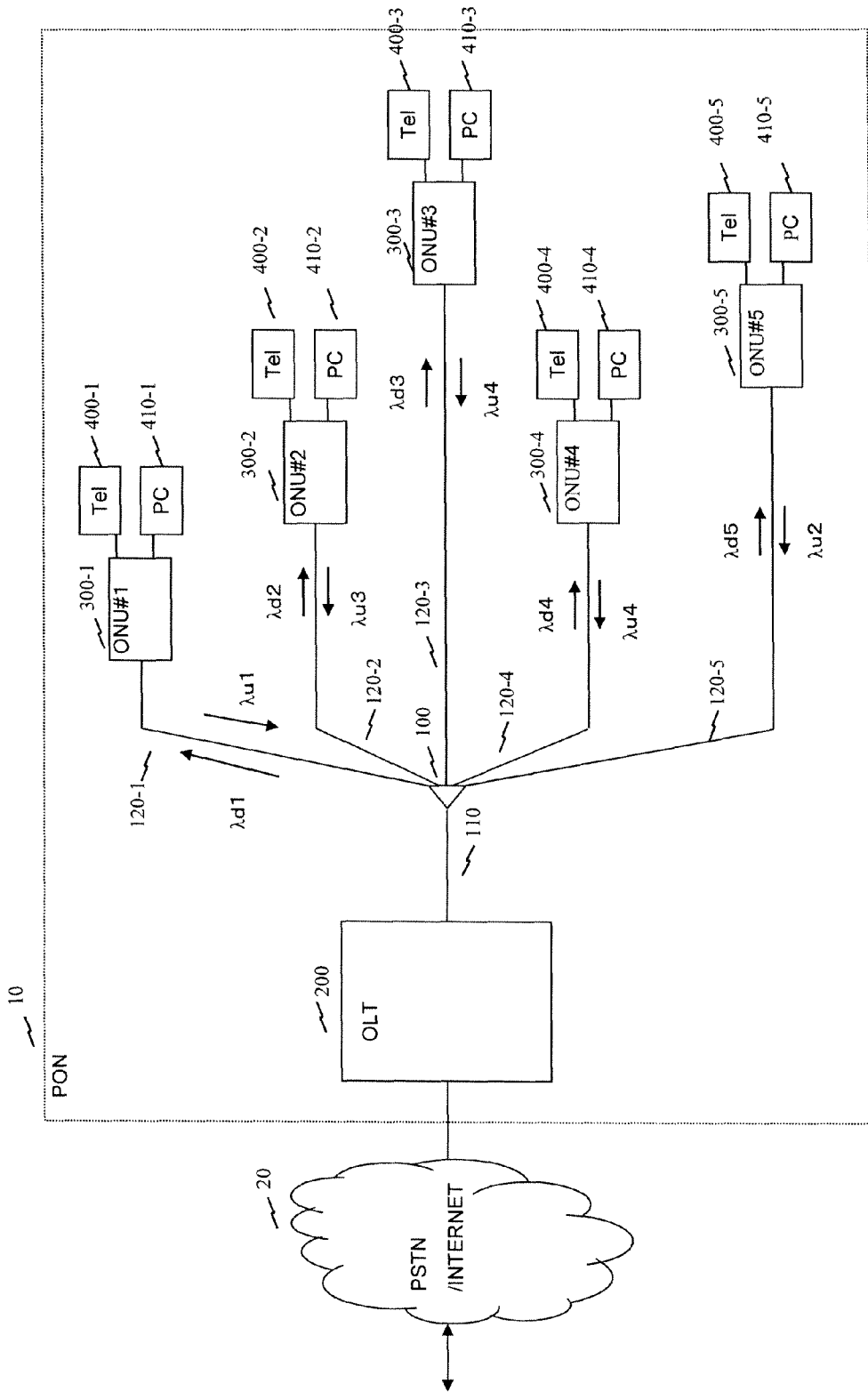
FIG. 1 is a network configuration view showing a configuration example of an optical access network using a PON according to this embodiment.

FIG. 1 shows a configuration example of an optical access network to which this embodiment is applied.

A PON 10 is connected to a PSTN/internet 20 to transmit or receive data. The PON 10 includes an optical splitter 100, a trunk fiber 110, a branch fiber 120, an OLT 200 and an ONU 300, a telephone 400, and a personal computer 410. The OLT 200 can be connected to, for example, thirty two ONUs 300 via one trunk fiber 110, the optical splitter 100 and the branch fiber 120. In FIG. 1, five ONUs are illustrated, each having different operating wavelength. In the illustrated example, the downlink wavelength used for each ONU is $\lambda d1$ for ONU300-1, $\lambda d2$ for ONU300-2, $\lambda d3$ for ONU300-3, $\lambda d4$ for ONU300-4, and $\lambda d5$ for ONU300-5. On the other hand, the uplink wavelength is in a situation where four wavelengths are shared among five ONUs, and is $\lambda u1$ for ONU300-1, $\lambda u3$ for ONU300-2, $\lambda u4$ for ONU300-3, $\lambda u4$ for ONU300-4, and $\lambda u2$ for ONU300-5 as an example. Each ONU can use the wavelength by changing it in time division. A signal from the OLT 200 to the ONU 300 is transmitted by making wavelength division multiplexing of signals addressed to the ONU 300. The signal received by the ONU 300 is received within the ONU 300 by selecting the wavelength addressed to it, and passed to the telephone 400 or the personal computer 410, based on the destination of signal. Also, in a direction from the ONU 300 to the OLT 200, the signals transmitted from the ONU300-1, ONU300-2, ONU300-3, ONU300-4 and ONU300-5 transmit data at the timing and wavelength indicated from the OLT 200, and after passing through the optical splitter 100, wavelength division multiplexed to arrive at the OLT 200.

In the example of FIG. 1, the five ONUs 300 are illustrated, and connected to the OLT 200. The number of ONUs connected to the OLT 200 and the maximum connectable number may be appropriate.

Figure 2:
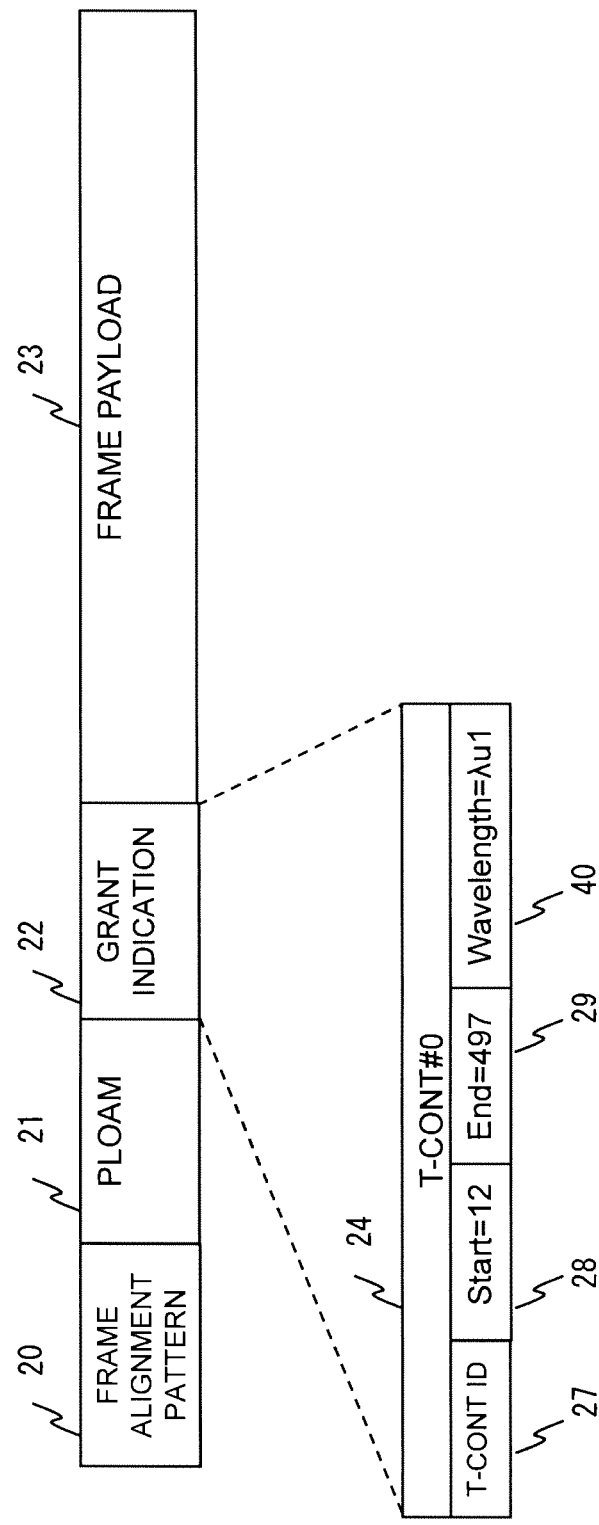
FIG. 2 is a frame organization view showing an organization example of an optical signal (downlink signal) from an OLT to an ONU.

FIG. 2 is a frame organization view showing an organization example of an optical signal (downlink signal) from the OLT to the ONU. The downlink signal such as a PON downlink frame (hereinafter sometimes referred to as a downlink frame or simply a frame) includes a frame alignment pattern 20, PLOAM 21, a grant indication 22 and a frame payload 23, as defined in the ITU-T recommendation G984.3. The frame payload 23 stores a user signal directed from the OLT 200 to each ONU 300. The grant indication 22 designates the uplink signal transmission timing (grant) of each ONU 300, and more particularly designates the grant for each TCONT (Transmission Container) that is a user signal control unit within each ONU 300. FIG. 2 shows one organization example corresponding to the configuration as shown in FIG. 1, with a TCONT0 signal 24 for controlling the ONU300-1. Each TCONT signal includes TCONT ID 27 for identifying the TCONT, Start 28 indicating the transmission start timing of signal and End 29 indicating the transmission end timing, and a transmission wavelength designation area 40. Herein, the transmission wavelength designation area 40 is not described in the ITU-T recommendation G984.3, and has been firstly proposed in the present invention and this embodiment. The Start 28 and End are designated in bytes, for example. The OLT 200 periodically transmits a message of permitting the transmission of uplink data including the grant indication 22 to each ONU 300 to designate how large uplink communication bandwidth is used in each TCONT. The Start 28 and End 29 are information indicating at which timing the transmission of data should be started and ended in each period where the OLT 200 transmits the grant indication. Within this designated section, the ONU 300 transmits the uplink signal at the wavelength designated in the transmission wavelength designation area 40. Instead of the End 29, the data length of data to be transmitted may be designated to transmit the data by the designated data length from the timing of the Start 28.

Figure 3:
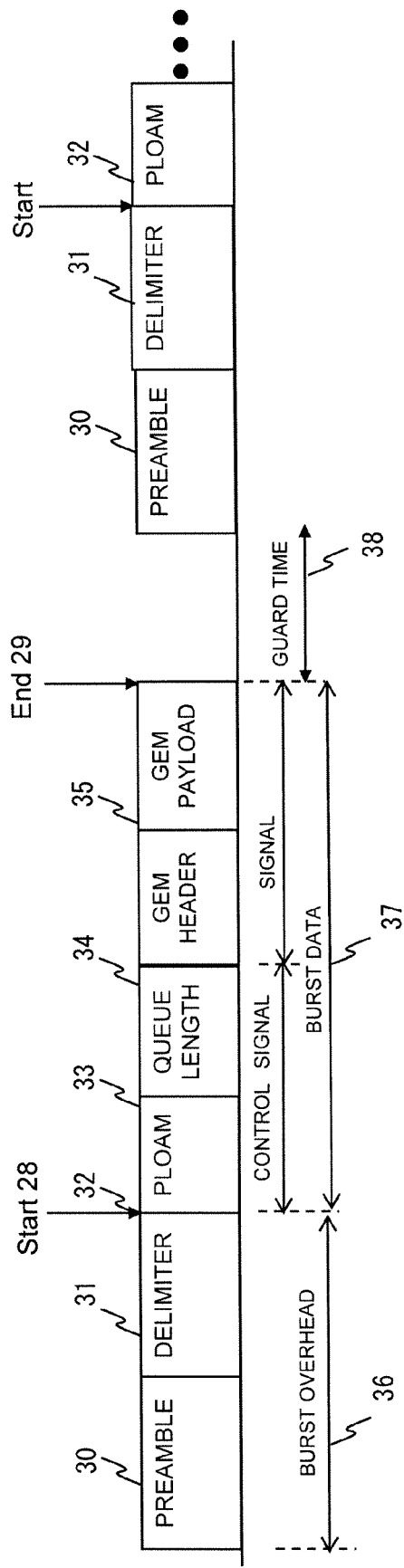
FIG. 3 is a signal organization view showing an organization example of an optical signal (uplink signal) from the ONU to the OLT.

FIG. 3 is a signal organization view showing an organization example of an optical signal (uplink signal) from the ONU to the OLT. The uplink signal such as a PON uplink frame (hereinafter sometimes referred to as a GEM packet or simply a packet) includes a burst overhead 36 of fixed length and burst data 37 that is variable length packet. The burst overhead 36 includes a preamble 30 and a delimiter 31. The burst data 37 includes a control signal composed of PLOAM 32 and a queue length 33 and a signal composed of a GEM header 34 of 5 bytes and a GEM payload 35 of variable length. The Start 28 of the TCONT signal 24 as described above indicates the start position of PLOAM 32, namely, the start position of the burst data 37, and the End value 29 indicates the end position of the GEM payload 35 (burst data 37). A guard time 38 is a no-signal section from the end position of the GEM payload 34 to the start position of the preamble 30 of the next packet, or a no-signal section of the length as defined in the ITU-T recommendation G984.3, for example, to prevent collision and interference of packets transmitted from each ONU on the trunk optical fiber 110. Accordingly, the guard time 38, the preamble area 30 and the delimiter area 31 are interposed between the burst data 37 transmitted from each ONU 300 (or TCONT), whereby there is an interval of several bytes between the End 29 of the burst data 37 and the Start 28 of the next burst data 37.

2. ONU

Figure 4:
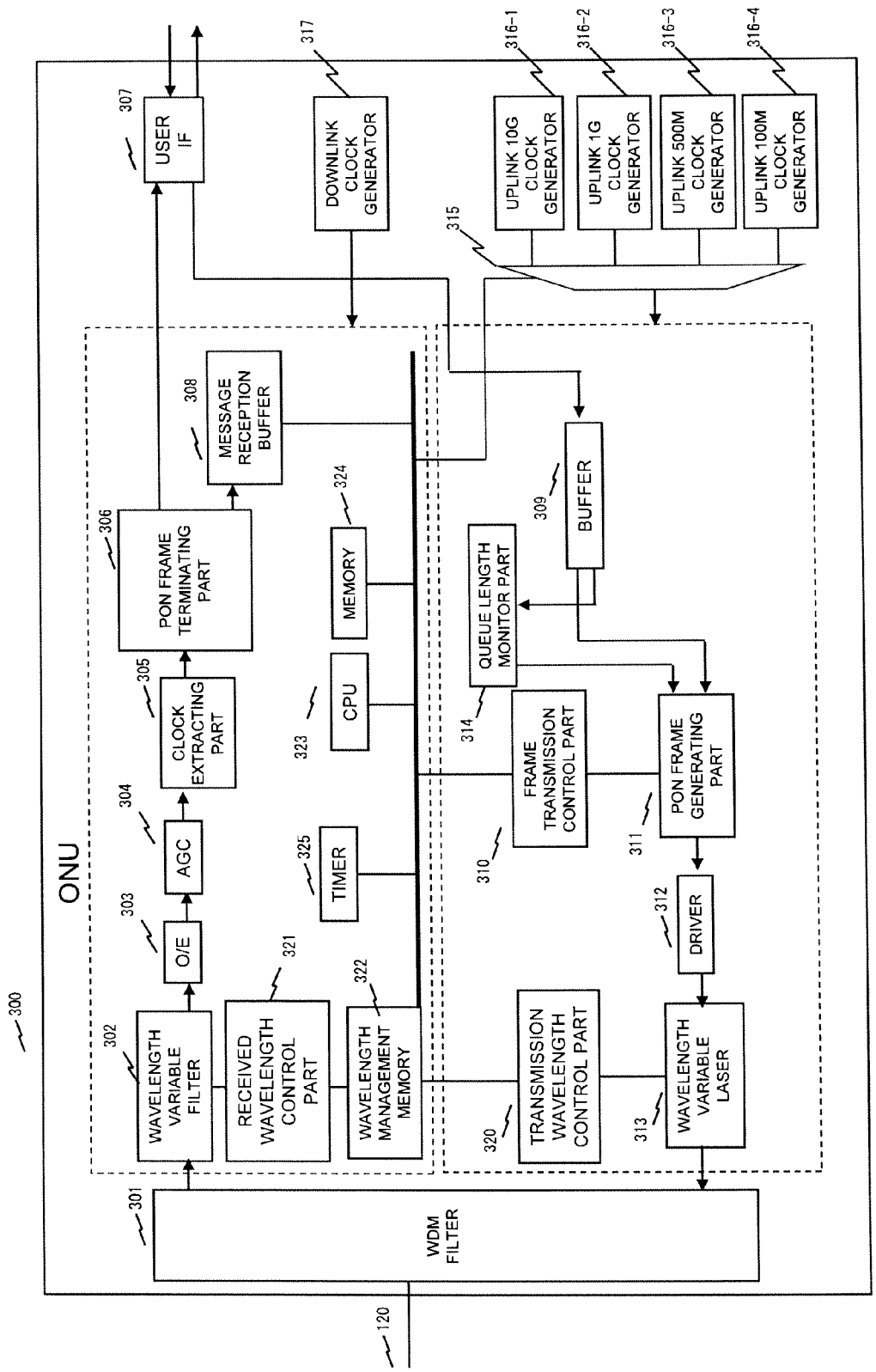
FIG. 4 is a block diagram showing a configuration example of the ONU according to this embodiment.

FIG. 4 is a block diagram showing a configuration example of the ONU 300 to which this embodiment is applied.

An optical signal received from the branch fiber 120 is separated by wavelength through a WDM filter 301 and passed through a wavelength variable filter 302 to select one of the downlink wavelengths $\lambda d1$ to $\lambda d32$. The optical signal is converted into electrical signal in the E/O 302, controlled to have the constant amplitude value in an AGC (Automatic Gain Control) 304, and retimed in a clock extracting part 305, and the signal is separated as described in connection with FIG. 2 in a PON frame terminating part 306. The signal in the PLOAM area 21 and the grant indication area 22 is sent to a message reception buffer 308 and the signal in the frame payload area 23 is sent to a user IF 307 and outputted.

Also, the signal inputted from the user IF 307 is temporarily stored in a buffer 309, read under the control of a frame transmission control part 310, and assembled into a format as described in connection with FIG. 3 in a PON frame generating part 311. The packet buffer 309 is monitored in the use amount of buffer by a queue length monitor part 314. The buffer use amount information is stored as the queue length 33 in a PON section frame, and passed to the OLT, and the OLT controls the grant amount to be issued based on the information of this queue length 33. The assembled signal is converted into optical signal by current driving a wavelength variable laser 313 in a driver 312 and sent through the WDM filter 301 to the branch fiber 120. A CPU 323 and a memory 324 are paired to make the monitor and control of each block within the ONU 300. For example, the CPU 323 performs the reset with the wavelengths decided beforehand in a wavelength management memory 322, for example, the downlink wavelength $\lambda d1$ and the uplink wavelength $\lambda u1$, as the initial values, immediately after the initiation of the ONU, or immediately after the ONU is connected to the fiber. A received wavelength control part 321 sets the wavelength of the wavelength variable filter 302, based on the value stored in the wavelength management memory 322, and a transmission wavelength control part 320 sets the wavelength of the variable wavelength laser 313, based on the value stored in the wavelength management memory 322. Also, the CPU 323 sends and receives a wavelength allocation message to and from the OLT 200, using the message reception buffer 308 and the message transmission buffer 310, while referring to a timer 325, and sets the allocated wavelength thereof in the wavelength management memory 322.

The clock for use in the ONU 300 always relies on the clock from a downlink clock generator 317 in a downlink signal block, and operates by enabling a selector 315 to select a clock 316 (100M clock for λu1, 500M clock for λu2, 1G clock for λu3 and 10G clock for λu4 in this example) adapted to the wavelength designated in the wavelength designation area 40 of the grant indication area 22 in an uplink signal block.

3. OLT

Figure 5:
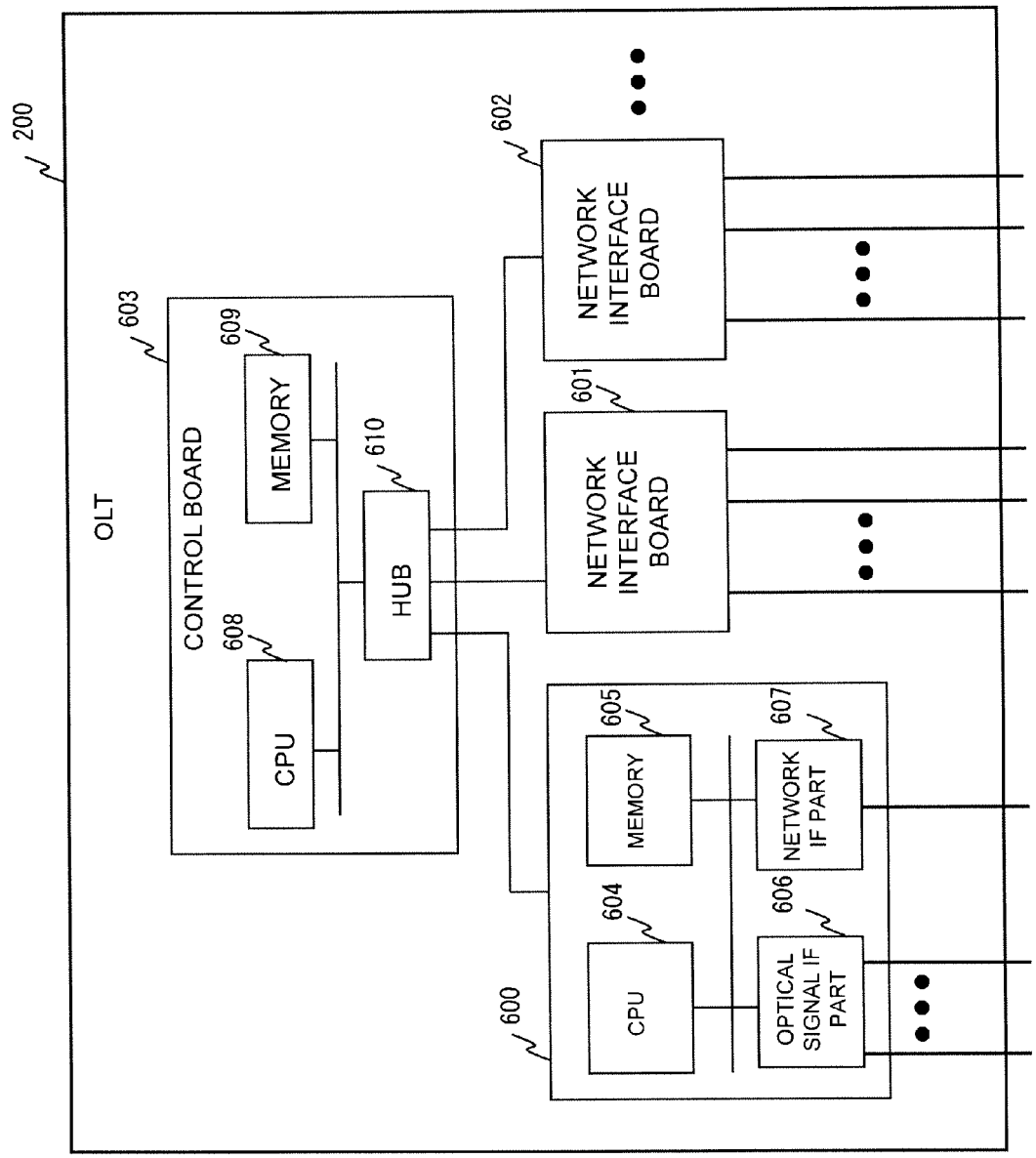
FIG. 5 is a block diagram showing a configuration example of the OLT according to this embodiment.

FIG. 5 is a block diagram showing a configuration example of the OLT for use in the PON according to this embodiment.

The OLT 200 includes a control board 603 for controlling the operation of the whole device, and plural network interface boards 600 to 602, connected to a network, for transmitting and receiving the signal. Herein, the control board 603 includes a CPU 608, a memory 609 and an HUB 610, in which the CPU 608 controls each of the network interface boards 600 to 602 via the HUB 610. Also, each of the network interface boards 600 to 602 includes an optical signal IF part 606 for separating the optical signal from the ONU 300 according to each wavelength, a network IF (interface) part 607 for transmitting and receiving the signal to and from the upper-level network 20 such as internet, and a CPU 604 and a memory 605 for performing the process required for transmitting and receiving the signal between the ONU 300 and the upper-level network 20. Various kinds of operation and maintenance methods as described in the following are implemented by the CPU 604 executing a program stored in the memory 605. Of course, a specific hardware (such as LSI) for these functions dedicated to each process may be employed as required. Also, the hardware configuration of the OLT 200 is not limited to the above description, but may be appropriately implemented in various ways as required.

Figure 6:
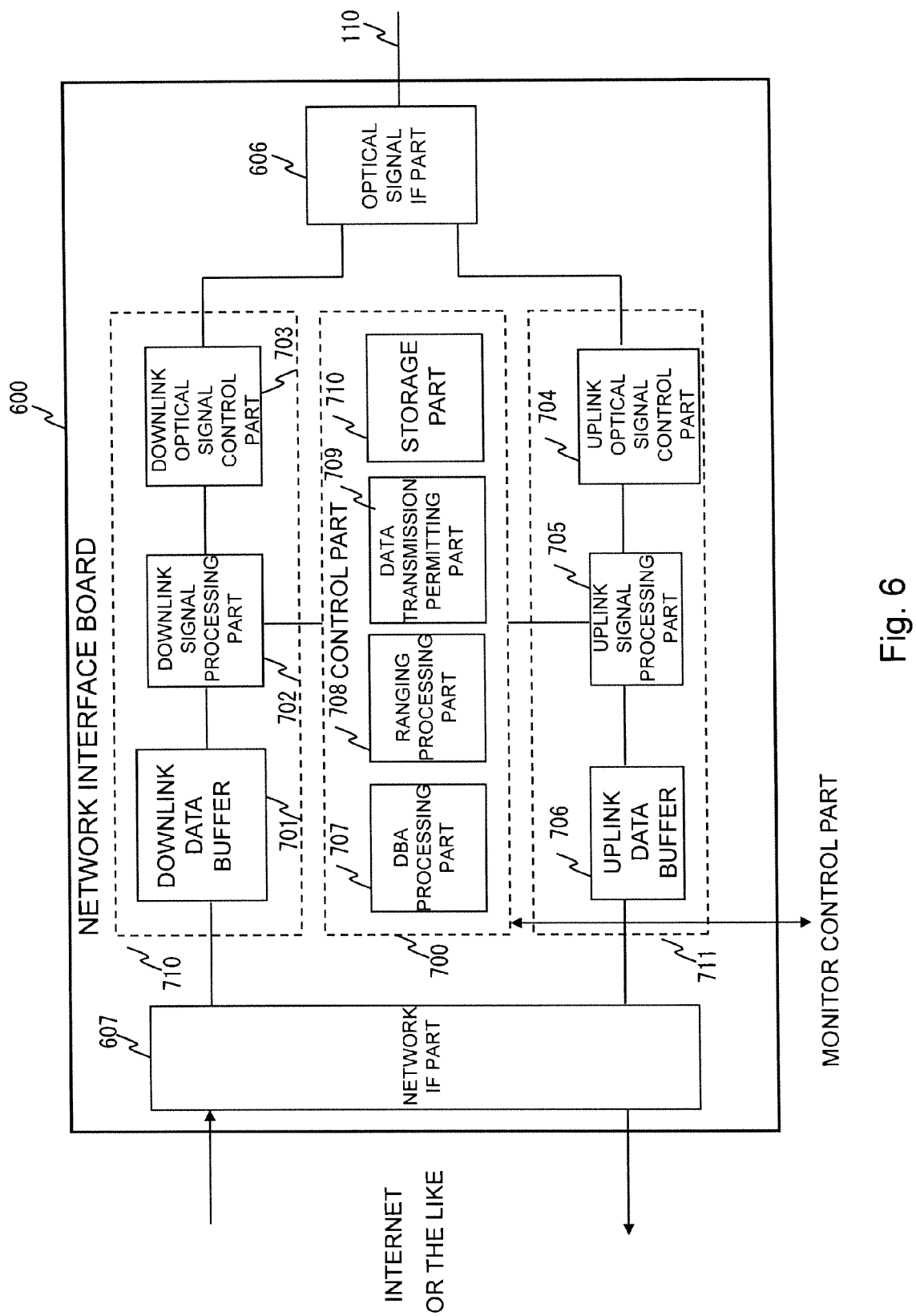
FIG. 6 is a block diagram showing a configuration example detailed in part of the OLT.

FIG. 6 is a block diagram showing a configuration example of a network interface board provided in the OLT.

The network interface board 600 largely includes the network IF part 607, a control part 700, a transmitting part 710, a receiving part 711, and the optical signal IF part 606. The transmitting part 710 includes a downlink data buffer 701, a downlink signal processing part 702, and a downlink optical signal control part 703. Also, the receiving part 711 includes an uplink optical signal control part 704, an uplink signal processing part 705, and an uplink data buffer 706. The downlink data buffer 701 temporarily accumulates data received via the network IF part 607 from the upper-level network 20. The downlink signal processing part 702 performs a process required to relay the signal from the upper-level network 20 to the ONU 300. The downlink optical signal control part 703 converts electrical signal into optical signal and transmits the optical signal (downlink signal) via the optical signal IF part 606 to the ONU. The uplink optical signal control part 704 converts the optical signal received via the optical signal IF part 606 from the ONU 300 into the electrical signal. The uplink signal processing part 705 performs a process required to relay the signal from the ONU 300 to the upper-level network 20. The uplink data buffer 706 temporarily accumulates data to be transmitted via the network IF part 607 to the upper-level network 20.

The control part 700, which is connected to each of the function blocks as described above, performs various kinds of process required to make the communication (monitor and control) with the plural ONUs 300, and has a function of relaying the signal between the upper-level network 20 and the ONU 300. A DBA processing part 707 performs a dynamic bandwidth assignment process for deciding, at every predetermined DBA period (0.5 msec period in this example), how large communication bandwidth is allocated to each of the plural ONUs 300 (TCONT) accommodated within the period by the OLT. This communication bandwidth indicates how long byte length is allocated to each ONU 300 (TCONT) in the total byte length that can be transmitted during one DBA period. A ranging processing part 708 measures the distance between the OLT 200 and each ONU 300 by measuring the time taken from sending a ranging signal for distance measurement to each ONU to receiving a reply to the signal, and adjusts the delay time of signal to transmit to prevent collision and interference of the signal from each ONU 300 to the OLT 200, before the OLT 200 performs data transmission and reception with the ONU 300. If the OLT 200 notifies the transmission delay time to each ONU 300, each ONU 300 transmits the data by adding the notified transmission delay time to the timing (grant indication) permitted to transmit the data designated in the DBA from the OLT 200. A data transmission permitting part 709 decides the timing Start (FIG. 2: 28) for each ONU 300 to start the data transmission in a certain grant period and the timing End (FIG. 2: 29) to end the transmission in byte length, based on the byte length of the transmit data to be permitted for each ONU 300 decided by the DBA processing part 707, and specifies the uplink signal wavelength (FIG. 2: 40) suitable for the data amount. That is, the grant indication is specified. A storage part 710 is a memory for storing information required for the process of the control part 700. The control part 700 communicates with a monitor control part (e.g., a maintenance terminal composed of PC) provided in the PON to preset the control parameters (e.g., subscription terms of the ONU, contract traffic and so on) required for the control in the control part, and receives the monitor information (e.g., fault occurrence situation, transmission permissible data amount for each ONU and so on), based on a request of the maintenance person.

Figure 7:
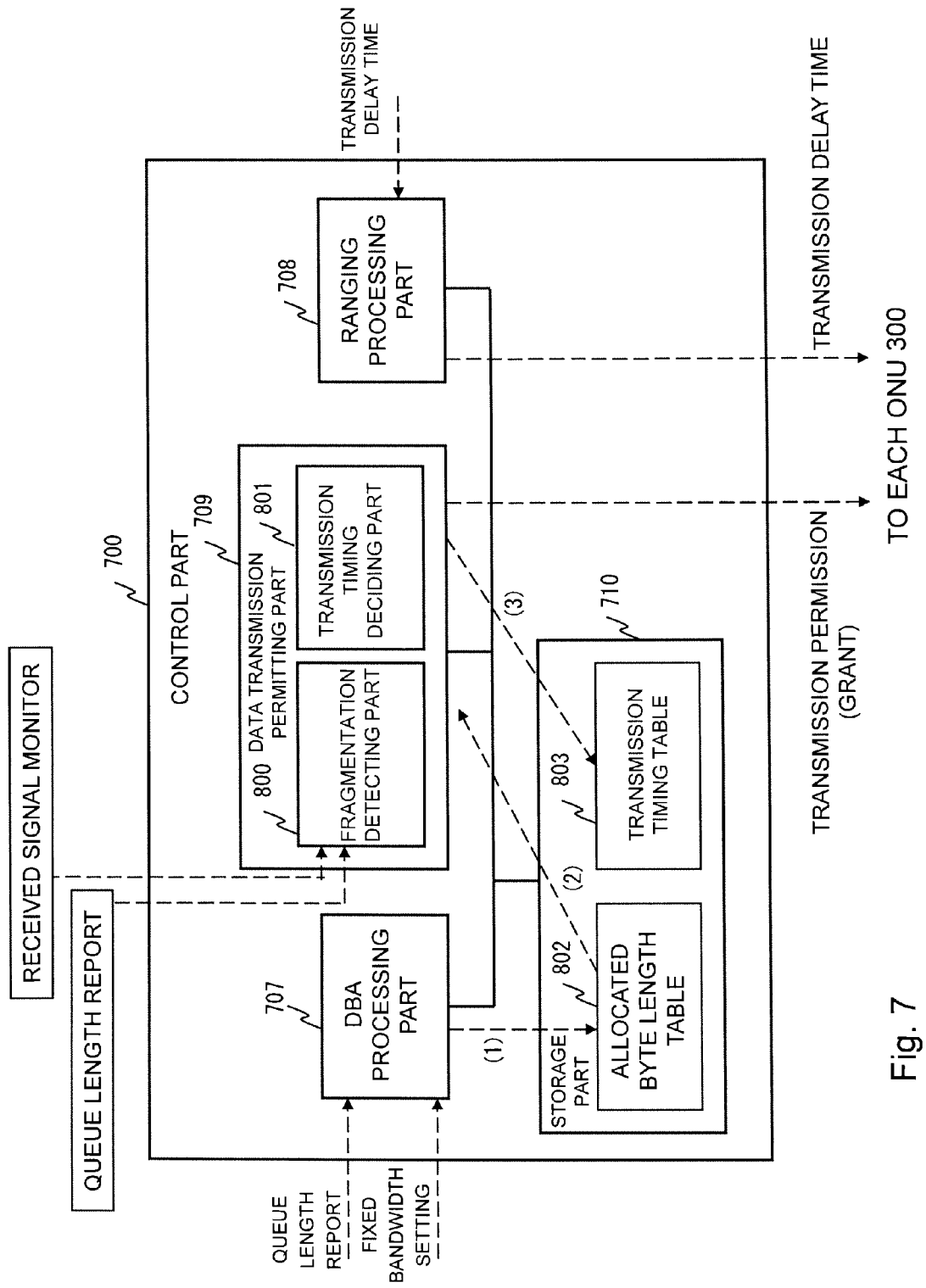
FIG. 7 is an explanatory diagram for explaining a configuration and operation example of a control part.

FIG. 7 is an explanatory diagram for explaining a configuration and operation example of the control part provided in the OLT.

In the control part 700, the DBA processing part 707 receives the transmission wait data amount held in each ONU 300 from the queue length (FIG. 3: 33) included in the uplink signal. For example, the received queue length can be made the transmission wait data amount. Also, in the DBA processing part 707, the communication bandwidth parameter is set for each ONU, based on the contract. The DBA processing part 707 decides the data amount permitted to transmit to each ONU 300 in byte length at each DBA period, based on the received transmission wait data amount (e.g., queue length) and the communication bandwidth parameter set by contract, creates an allocated byte length table 802 in which the TCONT-ID that is the TCONT identifier of each ONU and the allocated byte length are associated and stores it in the storage part 710 (FIG. 7: (1)).

FIG. 10 shows an organization example of the allocated byte length table 802. The allocated byte length table 802 includes a TCONT-ID 901 that is the identifier of TCONT and a byte length 902 allocated to TCONT in the DBA.

Figure 14:
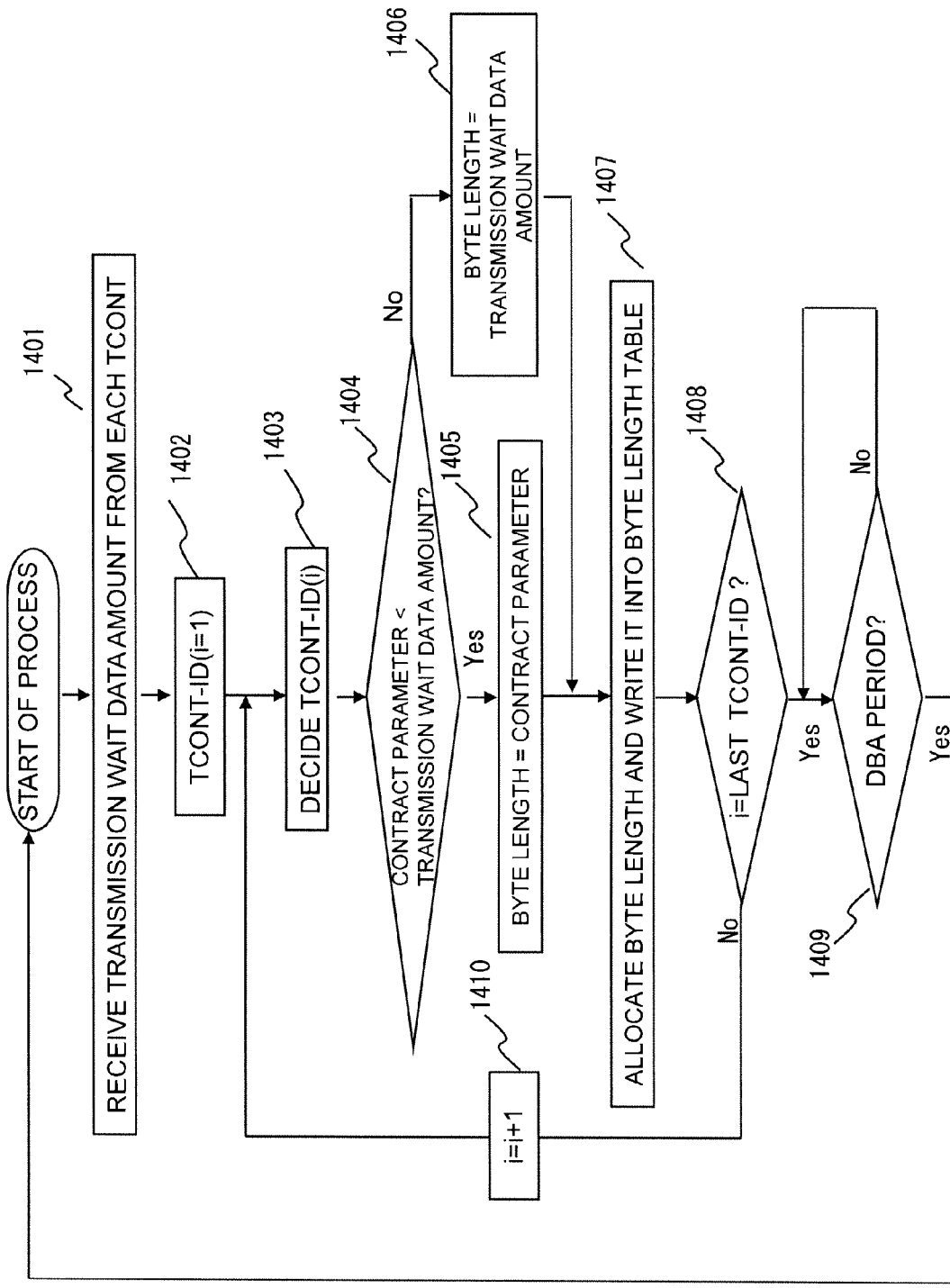
FIG. 14 is a flowchart showing a processing example of a method for deciding allocated bytes in FIG. 10.

FIG. 14 shows one example of a method for deciding the byte length in the allocated byte length table 802. The method for deciding the byte length is possible in various variations, but not limited to this example. First of all, the DBA processing part 707 collects the transmission wait data amount of each ONU 300 (1401), sets the initial value of the TCONT-ID to zero (1402), and decides the TCONT-ID to be processed (1403). The DBA processing part 707 compares the transmission wait data amount with the preset contract parameter (1404), in which if the transmission wait data amount is smaller than the contract parameter, it sets the contract parameter to the allocated byte length (1405), and writes the byte length into the allocated byte length table 802 (1407). Conversely, the DBA processing part 707 compares the transmission wait data amount with the contract parameter (1404), in which if the transmission wait data amount is greater than the contract parameter, it sets the transmission wait data amount to the allocated byte length (1406), and writes the byte length into the allocated byte length table 802 (1407). The DBA processing part 707 performs this process for all the registered TCONT-IDs (1408). And after the DBA period expires (1409), the DBA processing part 707 collects the transmission wait data amount of each ONU 300 again (1401), and performs the same process.

A transmission timing deciding part 801 provided in the data transmission permitting part 709 reads the content of the allocated byte length table 802 (FIG. 7: (2)), allocates the time slot corresponding to the byte length 902 allocated to each TCONT at every grant period, creates a transmission timing table 803 in which the TCONT-ID and the byte length allocated within each grant period are associated and stores it in the storage part 710 (FIG. 7: (3)). Herein, if a fragmentation detecting part 800 provided in the data transmission permitting part 709 detects the occurrence of fragmentation in which data of the byte length allocated to a certain TCONT is divided into plural time slots with grant periods and allocated, it instructs the transmission timing deciding part 801 to add the byte length of five bytes in length to the GEM header newly added to the latter half data divided by fragmentation, whereby the transmission timing deciding part 801 allocates the time slot based on the number of bytes after addition. Also, the transmission timing deciding part 801 creates a transmission permission message including the grant indication 22 in accordance with the contents of the created transmission timing table 803, and transmits it to each ONU 300 to notify the transmission timing of data.

Figure 11:
FIG. 11 is a memory organization view showing an organization example of a transmission timing table (in the case where the allocation bandwidth is allocated in order of TCONT-ID).

FIG. 11 shows an organization example of the transmission timing table 803. The transmission timing table 803 includes the TCONT-ID 901 that is the identifier of TCONT, a Start area 1002 for storing the data transmission start timing Start 28 within a certain grant period, an End area 1003 for storing the data transmission end timing End 29 and an uplink wavelength type 1004.

Figure 8:
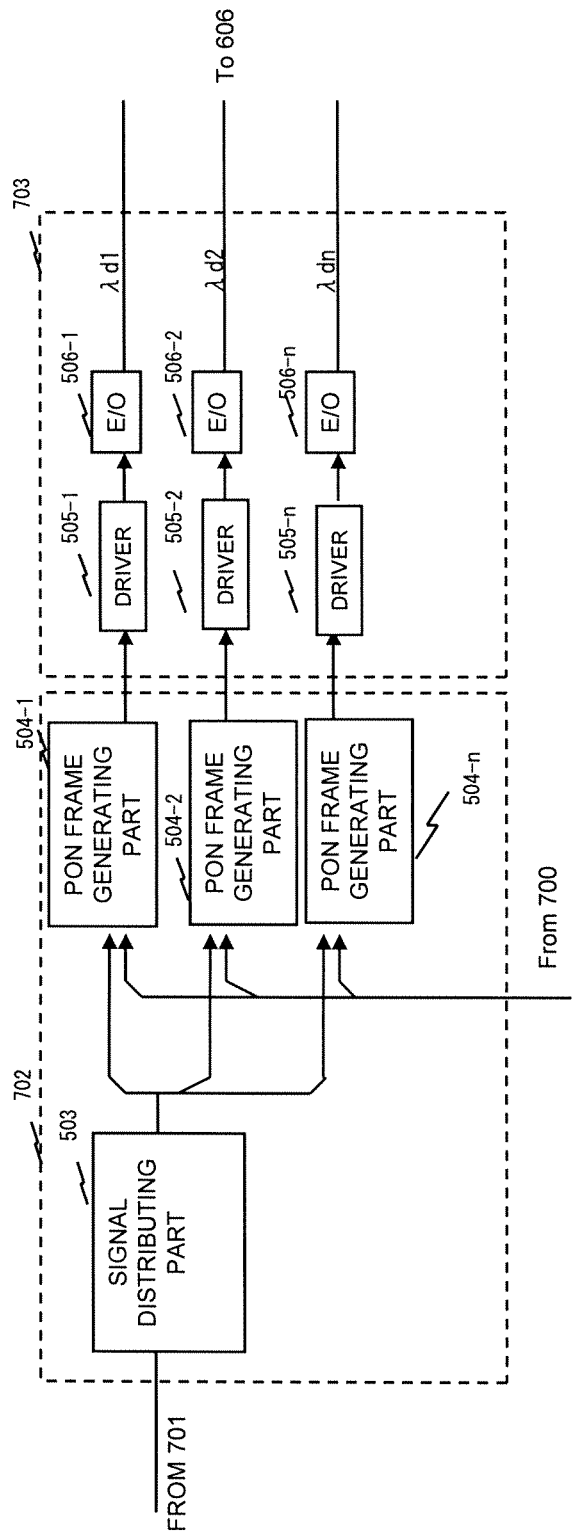
FIG. 8 is a block diagram showing a configuration example of a downlink signal processing part and a downlink optical signal control part.

FIG. 8 is a diagram showing a detailed configuration example of the downlink signal processing part and the downlink optical signal control part.

A downlink signal from the downlink data buffer 701 is distributed to each ONU in a signal distributing part 503, and a packet signal is transferred to the corresponding block of the PON frame generating parts 504-1 to 504-n. When the maximum number of ONUs connectable to the OLT 200 is n, n PON frame generating parts 504, n drivers 505 and n E/O 506 are provided. The PON frame generating part 504 assembles the frame in a format as described in connection with FIG. 2, based on the PLOAM information 21 or grant indication 22 notified from the control part 700 and the frame payload 23 from a signal distributing part 203. The assembled signal is converted from electrical signal into optical signal as the driver 505 current drives the E/O 506 and transmitted via the optical signal IF part 606 to the trunk fiber 110.

Figure 9:
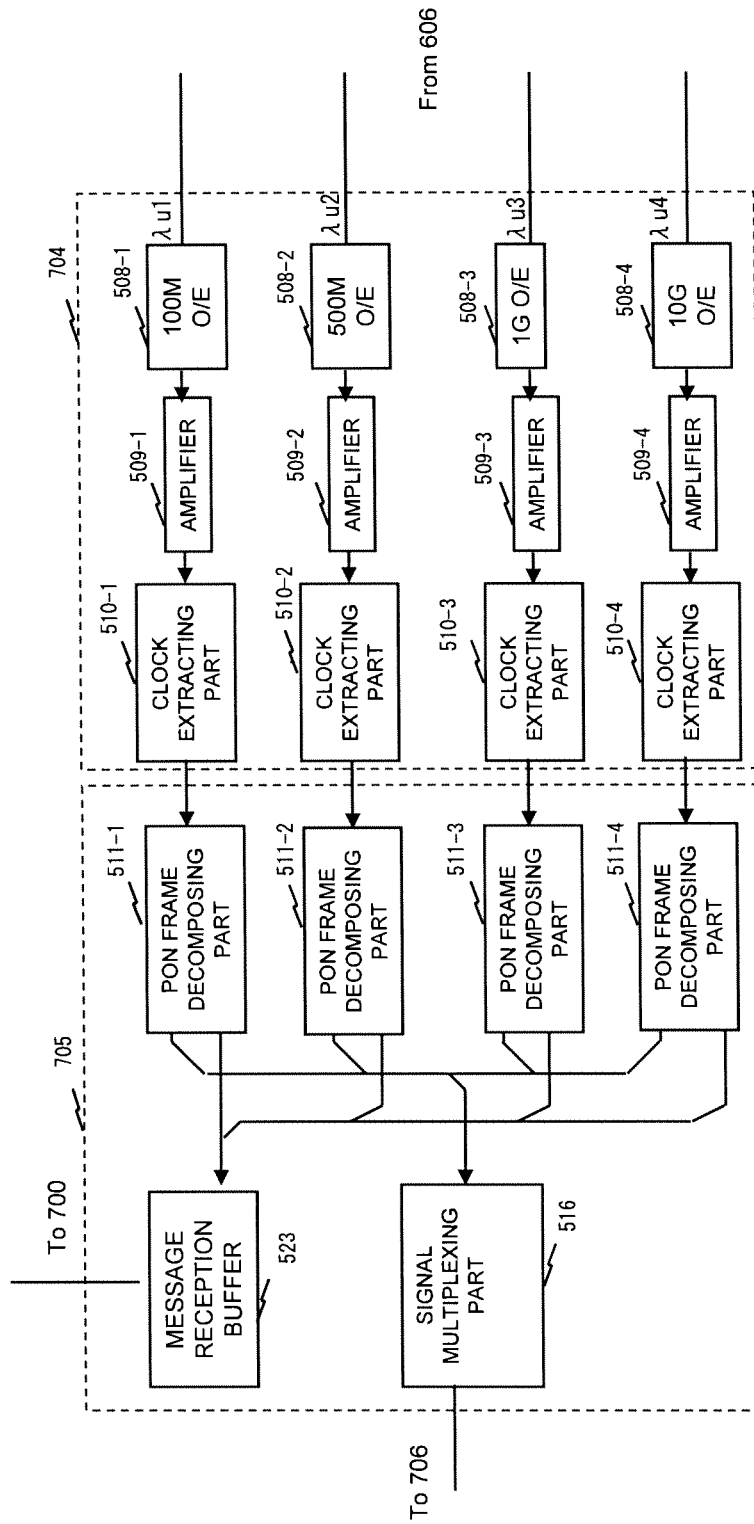
FIG. 9 is a block diagram showing a configuration example of an uplink signal processing part and an uplink optical signal control part.

FIG. 9 is a diagram showing a detailed configuration example of an uplink optical signal control part and an uplink signal processing part.

In this example, an instance of using the four wavelengths, including wavelength for 100 Mbit/s, wavelength for 500 Mbit/s, wavelength for 1 Gbit/s, and wavelength for 10 Gbit/s is taken for explanation, whereby four O/E 508, four amplifiers 509, four clock extracting parts 510, and four PON frame decomposing parts 511 are provided within the OLT 200. The optical signal received via the optical signal IF part 606 is converted into the electrical signal in the O/E 508, amplified in the amplifier 509, and retimed in the clock extracting part 510, whereby the overhead is separated by the PON frame decomposing part 511, and the packet is sent to a signal multiplexing part 516 and to the uplink data buffer 706. A message reception buffer 523 stores the control signal (PLOAM 32, queue length 33) required for the process in the control part 700 as shown in FIG. 3, and transfers it to the control part 700.

4. Wavelength Allocation

In FIGS. 10 to 13 and FIGS. 15 to 17, an example of implementing the dynamic wavelength allocation based on the end user traffic according to this embodiment is shown.

FIG. 10 shows an allocated byte table, as one example, in the case which as a result of receiving the queue length 33 from the ONU 300 and performing a DBA process in the control part 700 within the OLT 200, the allocated byte length of 486 bytes (equivalent to bandwidth 30 Mbit/s (correctly 31.104 Mbit/s)) is allocated to the ONU#1, the allocated byte length of 11340 bytes (equivalent to bandwidth 700 Mbit/s (correctly 725.76 Mbit/s)) is allocated to the ONU#2, the allocated byte length of 32400 bytes (equivalent to bandwidth 2 Gbit/s (correctly 2073.6 Mbit/s)) is allocated to the ONU#3, the allocated byte length of 12960 bytes (equivalent to bandwidth 800 Mbit/s (correctly 829.44 Mbit/s)) is allocated to the ONU#4, and the allocated byte length of 1458 bytes (equivalent to bandwidth 90 Mbit/s (correctly 93.312 Mbit/s)) is allocated to the ONU#5.

FIG. 11 shows a transmission timing table in which the allocation bandwidth is allocated in order of TCONT-ID in the same way as the DBA control that is applied in the conventional GPON system. That is, each wavelength is equivalent to the bandwidth and the allocated time slot length as follows. The time slot length for each wavelength can be pre-stored in an appropriate table in the storage part 710.

Figure 15:
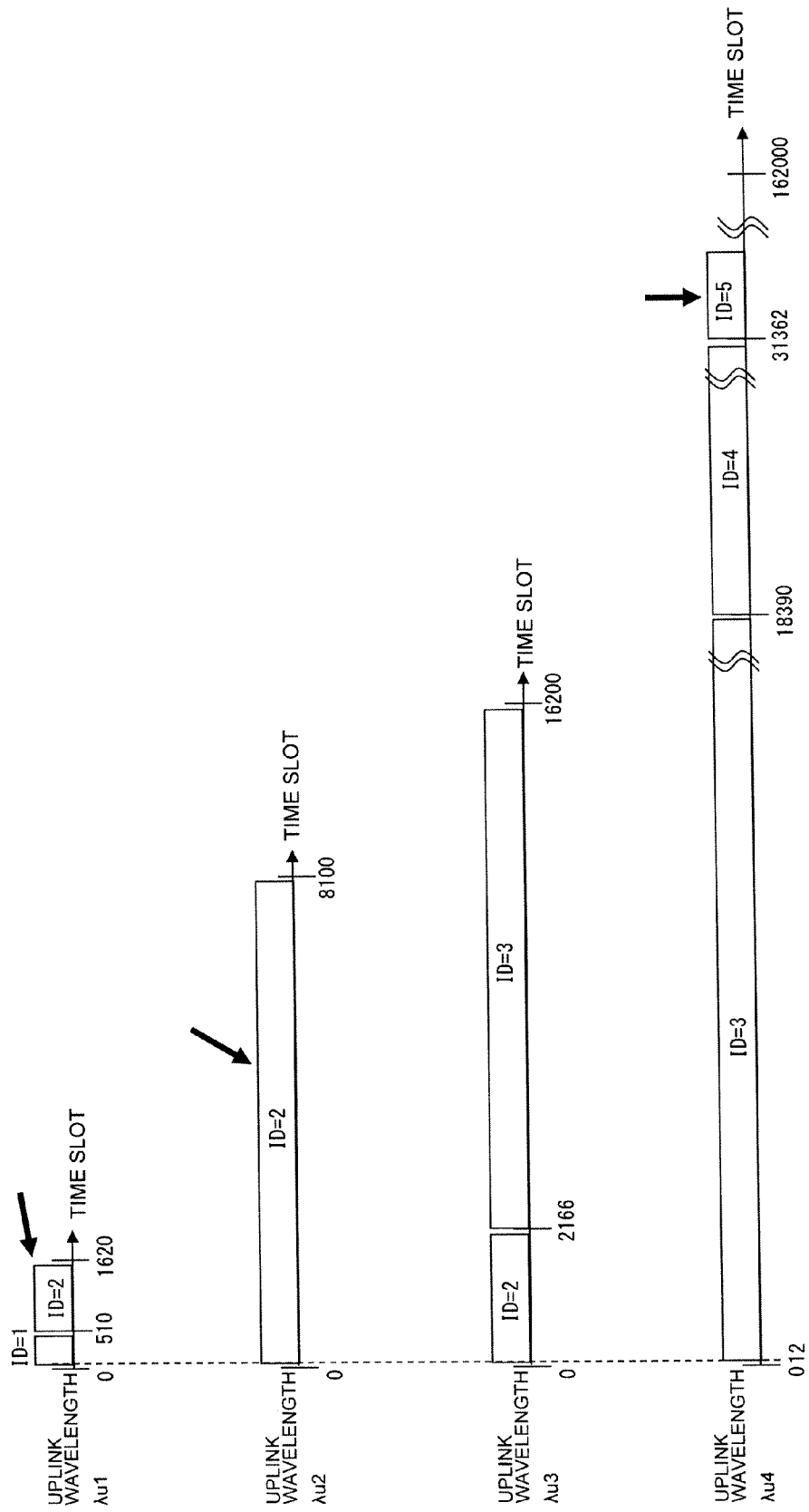
FIG. 15 is an uplink time slot for each uplink wavelength in the case of using the transmission timing table of FIG. 11.

$\lambda u1$: wavelength for bandwidth 100 Mbit/s (correctly 103.68 Mbit/s), allocated time slot length: 1620 bytes $\lambda u2$: wavelength for bandwidth 500 Mbit/s (correctly 518.4 Mbit/s), allocated time slot length: 8100 bytes $\lambda u3$: wavelength for bandwidth 1 Gbit/s (correctly 1036.8 Mbit/s), allocated time slot length: 16200 bytes $\lambda u4$: wavelength for bandwidth 10 Gbit/s (correctly 10368 Mbit/s), allocated time slot length: 162000 bytes FIG. 15 shows an uplink time slot chart for each uplink wavelength in the example of the transmission timing table 803 of FIG. 11. In FIG. 15, the allocated time slot length for each wavelength is shown, and the wavelength and transmission timing (transmission time slot) of uplink signal to each ONU of TCONT-ID are represented. In this example, the uplink wavelength is allocated in ascending order of bandwidth. Also, in this example, it is assumed that $\lambda u1$ is the wavelength for bandwidth 100 Mbit/s, $\lambda u2$ is the wavelength for bandwidth 500 Mbit/s, $\lambda u3$ is the wavelength for bandwidth 1 Gbit/s, and $\lambda u4$ is the wavelength for bandwidth 10 Gbit/s. In this allocation example, the uplink wavelength operable at lower rate clock (lower bandwidth) is allocated to the TCONT-ID with larger allocated bytes (bandwidth). On the other hand, the uplink wavelength operable at higher rate clock (higher bandwidth) is allocated to the TCONT-ID with smaller allocated bytes (bandwidth). For example, the ONU#2 (TCONT-ID=2) to which the allocated byte length of 11340, or the bandwidth 700 Mbit/s is allocated transmits the uplink signal, using the wavelength λu1 for 100 Mbit/s and the wavelength λu2 for 500 Mbit/s, whereas the ONU#5 (TCONT-ID=5) to which the allocated byte length 1458, or the bandwidth 900 Mbit/s, is allocated transmits the uplink signal, using the wavelength λu4 for 10 Gbit/s (see the arrow in the drawing). In this allocation example, the ONU with smaller allocated bandwidth uses the higher frequency clock, resulting in a situation inconsistent to the solution of the problem.

Figure 12:
FIG. 12 is a memory organization view showing an organization example of the transmission timing table (in the case where the allocation bandwidth is allocated in ascending order of bandwidth).
Figure 16:
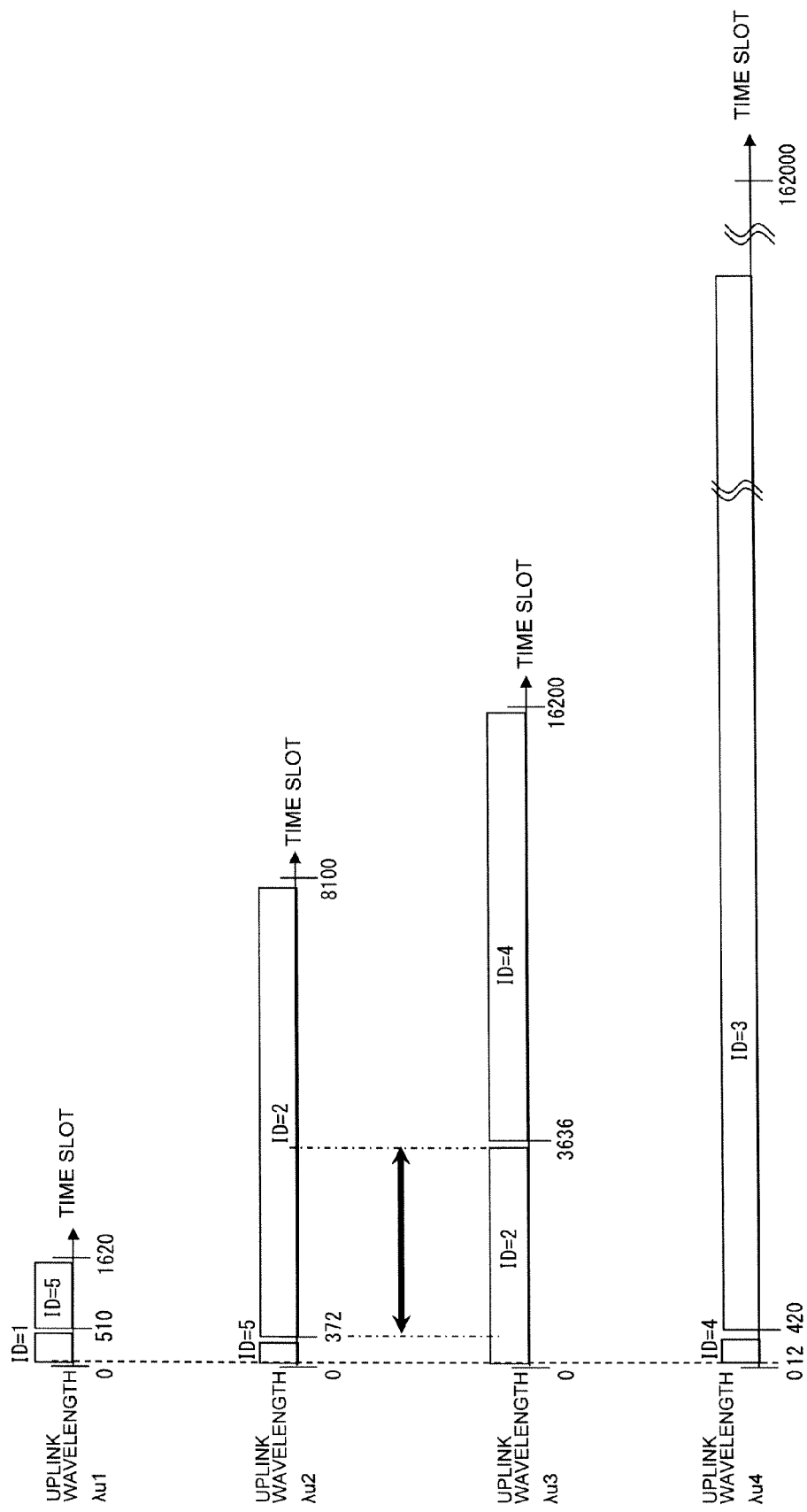
FIG. 16 is an uplink time slot for each uplink wavelength in the case of using the transmission timing table of FIG. 12.

Thus, an example for solving the problem of FIG. 11 is shown below. FIG. 16 is an uplink time slot chart for each uplink wavelength in the example of the transmission timing table 803 of FIG. 12. In FIG. 16, the allocated time slot length for each wavelength is shown, and the wavelength and transmission timing (transmission time slot) of uplink signal to each ONU of TCONT-ID are represented. In FIG. 12, the transmission timing table is shown in which the allocation bandwidth is not made in order of TCONT-ID as shown in FIG. 11, but allocated in ascending order of allocation bandwidth. Referring to FIG. 10, since the allocated byte length, or the allocation bandwidth, is smaller in order in which the TCONT-ID is 1, 5, 2, 4 and 3, each wavelength is allocated in accordance with this order or in ascending order of the bandwidth and in order of λu1, λu2, λu3 and λu4 in FIGS. 12 and 16. In this example, the wavelength of lower frequency is allocated in ascending order of the allocation bandwidth, making it possible to solve the problem occurring in FIG. 10.

However, another problem occurs in the example of FIG. 12. For example, the uplink wavelengths λu2 and λu3 are allocated to the ONU of TCONT-ID=2 at the same time from the time slot 372 to 3623. That is, the allocated time slot of the ONU of TCONT-ID=2 is allocated starting from the Start 372 value up to the Stop value 8099 at the wavelength λu2, while the number of bytes not allocated at the wavelength λu2 is allocated at the wavelength λu3 starting from the Start value 12 to the Stop value 3623. In the ONU of TCONT-ID=2, there are two allocated wavelengths λu2 and λu3 in the time slots from the Start value 372 to the Stop value 3623 (see the arrow in the drawing), whereby the uplink signal can not be physically transmitted to the OLT.

Figure 13:
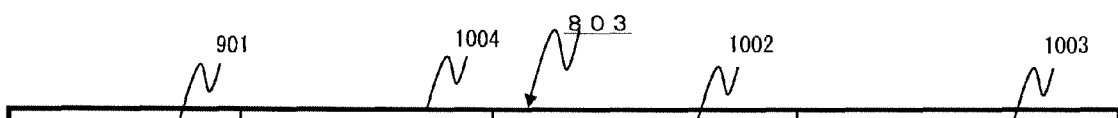
FIG. 13 is a memory organization view showing an organization example of the transmission timing table (in the case where the allocation bandwidth is allocated in ascending order of bandwidth and allocated bandwidth<maximum bandwidth set for each wavelength).
Figure 17:
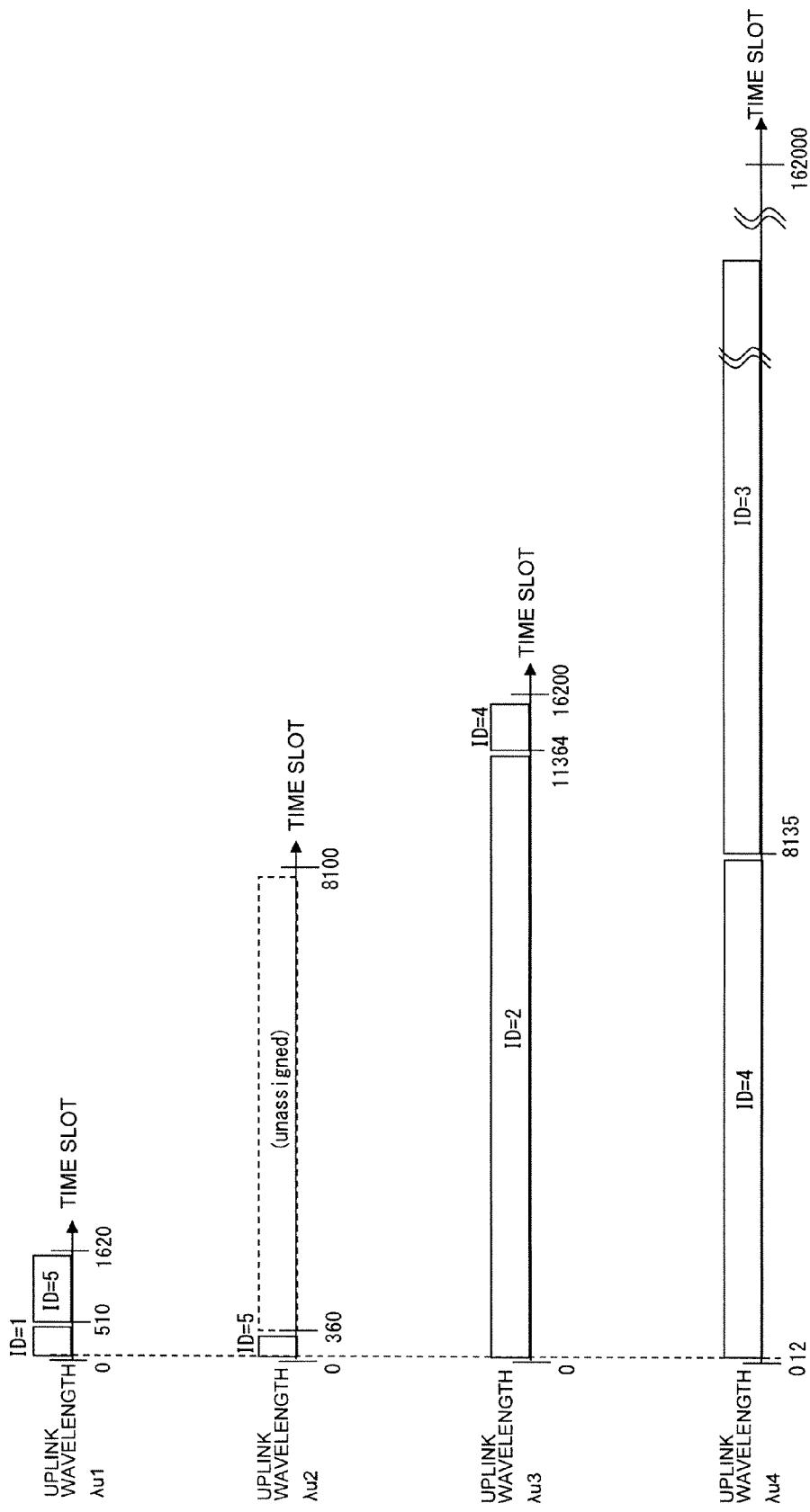
FIG. 17 is an uplink time slot for each uplink wavelength in the case of using the transmission timing table of FIG. 13.

In FIG. 13, an example for solving the problem of FIG. 11 is shown. In this transmission timing table 803, the allocation bandwidth is allocated in ascending order of bandwidth, so that the allocation bandwidth is smaller than the maximum bandwidth set for each wavelength. FIG. 17 is an uplink time slot chart for each uplink wavelength in the example of the transmission timing table 803 of FIG. 13. In FIG. 17, the allocated time slot length for each wavelength is shown, and the wavelength and transmission timing (transmission time slot) of uplink signal to each ONU of TCONT-ID are represented. In this allocation example, the uplink wavelength operable at lower rate clock (lower bandwidth) is allocated to the TCONT-ID with smaller allocated bytes (bandwidth) (e.g., TCONT-ID=1 and 5). On the other hand, the uplink wavelength operable at higher rate clock (higher bandwidth) is allocated to the TCONT-ID with larger allocated bytes (bandwidth) (e.g., TCONT-ID=2, 3 and 4). And in this example, the uplink wavelengths are not allocated at the same time (overlapping the same transmission time slot or transmission timing) at each TCONT-ID. In this way, the problem of FIG. 12 can be solved by allocating the next wavelength, not the concerned wavelength, to the ONU to which the bandwidth is allocated beyond the bandwidth set for the wavelength (e.g., 100 Mbit/s for λu1). That is, for example, in the ONU of TCONT-ID=5, the wavelength λu1 is used from the time slot 510 to 1619, and the wavelength λu2 is used from the time slot 1112 to 359, whereby only one allocated wavelength exists in a certain time slot.

5. Transmission Timing Table Generation Process

Figure 18:
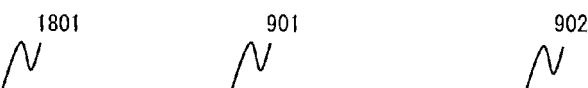
FIG. 18 is a view of rearranging data of the allocated byte table of FIG. 10 in ascending order of allocated byte length.
Figure 19:
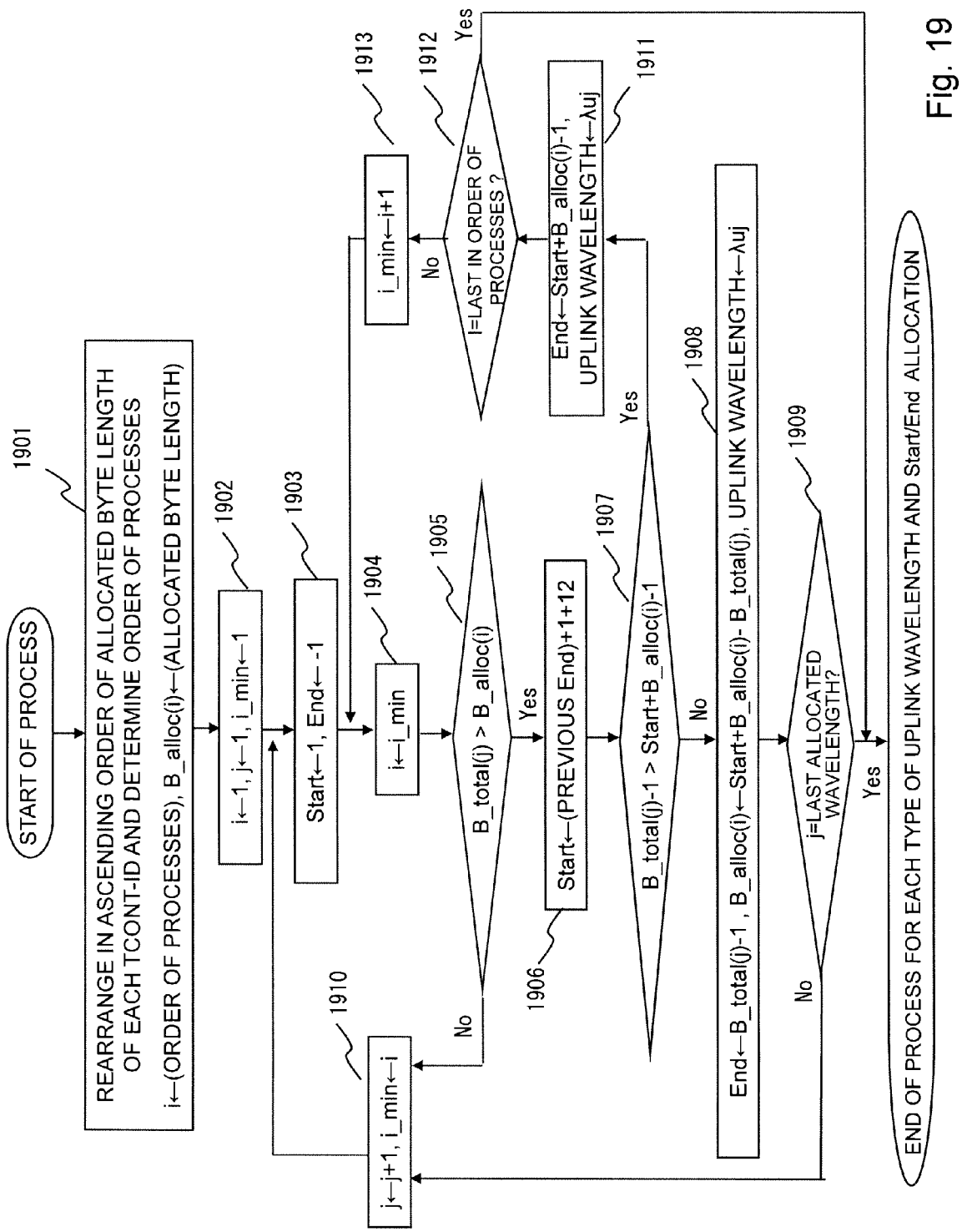
FIG. 19 is a flowchart showing a processing example of a method for deciding the type of uplink wavelength and Start/End in FIG. 13.

In FIGS. 18 and 19, a process for generating the transmission timing table 803 of FIG. 13 using the allocated byte length table 802 of FIG. 10 is shown.

FIG. 18 shows a table in which the data of the allocated byte table of FIG. 10 is rearranged in ascending order of allocated byte length. A transmission timing deciding process is performed in order of the TCONT-ID 901 according to the processing order 1801.

FIG. 19 shows a flowchart showing a processing example of a method for deciding the type of uplink wavelength and Start/End in FIG. 13. This flowchart is performed by the control part 700, or specifically the transmission timing deciding part 801. First of all, the transmission timing deciding part 801 rearranges in ascending order of the allocated byte length by referring to the allocated byte length table 802 of FIG. 10, and determine the order of processes, whereby i is made the processing order 1801 and B_alloc(i) is made the allocated byte length 902 (1901). The rearranged table may be stored in another area of the allocated byte length table 802, or overwritten on it. For the allocated byte length 902, i is set to 1, j indicating the type of uplink wavelength is set to 1 and i_min is set to 1 at the initialization of the processing flow (1902). The transmission timing deciding part 801 sets Start to 1 and End to −1 at the initialization of Start and End (1903). The transmission timing deciding part 801 substitutes i_min into i (1904). B_total(j) is the length of time slot for each wavelength, in which B_total(1) of λu1 is 1620 bytes, B_total(2) of λu2 is 8100 bytes, B_total(3) of λu3 is 16200 bytes, and B_total(4) of λu4 is 162000 bytes in this embodiment. The time slot length for each wavelength is pre-stored in an appropriate storage area of the storage part 760, whereby the transmission timing deciding part 801 can obtain B_total(j) by referring to it. The transmission timing deciding part 801 compares B_total(j) and B_alloc(i) (1905), in which if B_total(j) is larger, Start is decided by substituting (previous End value)+1+12 into Start (1906). If B_total(j) is smaller, the transmission timing deciding part 801 increments j by 1, and substitutes i into i_min (1910), whereby the operation returns to step 1903. After deciding the Start (1906), the transmission timing deciding part 801 compares B_total(j)−1 and Start+B_alloc(i)−1 (1907), in which if B_total(j)−1 is greater, End is decided by substituting Start+B_alloc(i)−1 into End (1911), and the uplink wavelength is decided as λuj. The transmission timing deciding part 801 ends the process if i is the last order of processes at the subsequent step 1912, or substitutes i+1 into i_min (1913), if i is not the last order of processes, whereby the operation returns to step 1904. The transmission timing deciding part 801 substitutes B_alloc (i)−1 into End and substitutes Start+B_alloc(i)−1 (1911) to decide End (1908), if B_total(j)−1 is smaller at comparison step 1907. At the same time, the transmission timing deciding part 801 substitutes Start+B_alloc(i)−B_total(j) into B_alloc (i) (1908), and decides the uplink wavelength as λuj (1908). Thereafter, the transmission timing deciding part 801 ends the process, if j is the last allocated wavelength at step 1909, or increments j by 1 and substitutes i into i_min (1910), if j is not the last allocated wavelength, whereby the operation returns to step 1903. In the process, +1+12 is the byte length between Start/End of data or from data to data such as guard time, and may be preset to an appropriate value. The transmission timing deciding part 801, after setting the data such as Start, End and uplink wavelength at each of the above steps, stores those data in the applicable columns of TCONT-ID in the transmission timing table 803 at an appropriate timing.

Referring to a flowchart of FIG. 19, an example of allocation as in FIG. 17 will be described below using the table of FIG. 18.

First of all, at the processing order i=1, the allocated byte length 486 of TCONT-ID=1 passes through steps 1901 to 1905 and is compared with the time slot length 1620 of λu1, and at step 1906, Start='12'. Further, at step 1907, $$1620>12+486-1$$

whereby at step 1911, End='497' and the uplink wavelength is set to λu1.

After processing at steps 1912 and 1913, at the processing order i=2, the allocated byte table 1458 of TCONT-ID=5 passes through steps 1904 and 1905 and is compared with the time slot length 1620 of λu1, and at step 1906, becomes Start-'510' (=497+1+12). Further, at step 1907, $$1620-1<510+1458-1$$

whereby at step 1908, End='1619' and the uplink wavelength is set to λu1. Further, the remaining allocated byte length (B_alloc(i)=510+1458−1620=348) passes through step 1910 and has the wavelength changed to λu2, whereby through steps 1903 to 1906, Start='12' and the uplink wavelength is set to λu2, and further through steps 1907 to 1911, End=12+348−1='359' and the uplink wavelength is set to λu2.

Similarly, the same process is repeated for the processing order i=3 and beyond.

Industrial Applicability

The invention is usable in a PON system, for example, but may be additionally applied to a system in which the uplink wavelength is allocated to each terminal or terminating device.

The invention claimed is:

1. An optical multiplexing terminating device in a passive optical network system in which the optical multiplexing terminating device connected to an upper-level communication network and a plurality of optical network terminating devices for accommodating the subscriber terminals are connected via an optical fiber network having an optical splitter and a plurality of optical fibers, the communication from said optical multiplexing terminating device to said optical network terminating device being made using a different wavelength allocated for said each optical network terminating device, and the communication from said optical network terminating device to said optical multiplexing terminating device being made using plural wavelengths of a smaller number than the total number of said optical network terminating devices connected to said optical multiplexing terminating device and operable in plural different time slot lengths, said optical multiplexing terminating device comprising:

a transmission timing table for storing, for each optical network terminating device ID, a type of uplink wavelength, a start position of transmission time slot, and an end position of transmission time slot;

an allocated byte length table for storing, for each optical network terminating device ID, an allocated byte length indicating data amount permitted to transmit; and a control part for allocating the type of uplink wavelength and the transmission time slot to each optical network terminating device by referring to said transmission timing table and said allocated byte length table;

wherein said control part rearranges in ascending order of allocated byte length for each optical network terminating device ID by referring to said allocated byte length table, and determines order of processes;

selects the type of uplink wavelength in ascending order of time slot length corresponding to the wavelength, for the optical network terminating device ID in ascending order of the order of processes by referring to said allocated byte length table;

compares the time slot length corresponding to the selected type of uplink wavelength with the allocated byte length of the optical network terminating device ID read from said allocated byte length table;

allocates the type of wavelength as a first wavelength type, if the time slot length of the selected type of wavelength is greater than the allocated byte length of the optical network terminating device ID, while on the other hand, allocates the wavelength of which the time slot length is greater than the time slot length of the selected type of wavelength and the time slot length is greater than the allocated byte length of the optical network terminating device ID, as a first wavelength type, if the time slot length of the selected type of wavelength is smaller than the allocated byte length of the optical network terminating device ID;

if all of the allocated byte lengths are allocated within the time slot length in which the transmission time slot is not allocated with the first wavelength type, sets a start position and an end position of transmission time slot, and stores the start position and the end position along with the first uplink wavelength type in said transmission timing table associated with the optical network terminating device ID; and on the other hand, if all of the allocated byte lengths are not allocated within the time slot length in which the transmission time slot is not allocated with the first wavelength type, allocates part of the allocated byte length which can be allocated within the time slot length of the first uplink wavelength type, sets a start position and an end position of the transmission time slot, and stores the start position and the end position along with the first uplink wavelength type in said transmission timing table associated with the optical network terminating device ID, and further, within a time slot length of a second wavelength type of which the time slot length is next greater than the time slot length of the first uplink wavelength type and transmission time slot is not yet allocated, allocates the remaining allocated byte length, sets a start position and an end position of transmission time slot, and stores the start position and the end position along with the second uplink wavelength type in said transmission timing table associated with the optical network terminating device ID.

2. The optical multiplexing terminating device according to claim 1, wherein said control part further allocates, for each optical network terminating device ID, a guard time and/or a byte for start position and/or a time slot for end position.

3. The optical multiplexing terminating device according to claim 1, wherein said control part further receives the information indicating the transmission wait data amount from each optical network terminating device;

compares the transmission wait data amount with a preset contract parameter; and if the contract parameter is greater than the transmission wait data amount, sets the contract parameter to the allocated byte length, and writes the allocated byte length into said allocated byte table, while if the transmission wait data amount is greater than the contract parameter, sets the transmission wait data amount to the allocated byte length, and writes the allocated byte length into said allocated byte table.

4. The optical multiplexing terminating device according to claim 1, wherein said control part further creates a downlink frame including the optical network terminating device ID, the start position, the end position, and a grant indication having set the information including the uplink wavelength type, by referring to said transmission timing table.

5. A passive optical network system in which an optical multiplexing terminating device connected to an upper-level communication network and a plurality of optical network terminating devices for accommodating the subscriber terminals are connected via an optical fiber network having an optical splitter and a plurality of optical fibers, the communication from said optical multiplexing terminating device to said optical network terminating device being made using a different wavelength allocated for said each optical network terminating device, and the communication from said optical network terminating device to said optical multiplexing terminating device being made using plural wavelengths of in a smaller number than the total number of said optical network terminating devices connected to said optical multiplexing terminating device and operable in plural different time slot lengths, said optical multiplexing terminating device comprising:

a transmission timing table for storing, for each optical network terminating device ID, a type of uplink wavelength, a start position of transmission time slot, and an end position of transmission time slot;

an allocated byte length table for storing, for each optical network terminating device ID, an allocated byte length indicating data amount permitted to transmit; and a control part for allocating the type of uplink wavelength and the transmission time slot to each optical network terminating device by referring to said transmission timing table and said allocated byte length table;

wherein said control part rearranges in ascending order of allocated byte length for each optical network terminating device ID by referring to said allocated byte length table, and determines order of processes;

selects the type of uplink wavelength in ascending order of time slot length corresponding to the wavelength, for the optical network terminating device ID in ascending order of the order of processes by referring to said allocated byte length table;

compares the time slot length corresponding to the selected type of uplink wavelength with the allocated byte length of the optical network terminating device ID read from said allocated byte length table;

allocates the type of wavelength as a first wavelength type, if the time slot length of the selected type of wavelength is greater than the allocated byte length of the optical network terminating device ID, while on the other hand, allocates the wavelength of which the time slot length is greater than the time slot length of the selected type of wavelength and the time slot length is greater than the allocated byte length of the optical network terminating device ID, as a first wavelength type, if the time slot length of the selected type of wavelength is smaller than the allocated byte length of the optical network terminating device ID;

if all of the allocated byte lengths are allocated within the time slot length in which the transmission time slot is not allocated with the first wavelength type, sets a start position and an end position of transmission time slot, and stores the start position and the end position along with the first uplink wavelength type in said transmission timing table associated with the optical network terminating device ID; and on the other hand, if all of the allocated byte lengths are not allocated within the time slot length in which the transmission time slot is not allocated with the first wavelength type, allocates part of the allocate byte length which can be allocated within the time slot length of the first uplink wavelength type, sets a start position and an end position of the transmission time slot, and stores the start position and the end position along with the first uplink wavelength type in said transmission timing table associated with the optical network terminating device ID, and further, within a time slot length of a second wavelength type of which the time slot length is next greater than the time slot length of the first uplink wavelength type and transmission time slot is not yet allocated, allocates the remaining allocated byte length, sets a start position and an end position of transmission time slot, and stores the start position and the end position along with the second uplink wavelength type in said transmission timing table associated with the optical network terminating device ID.

6. A method for allocating wavelength in a passive optical network system in which an optical multiplexing terminating device connected to an upper-level communication network and a plurality of optical network terminating devices for accommodating the subscriber terminals are connected via an optical fiber network having an optical splitter and a plurality of optical fibers, the communication from said optical multiplexing terminating device to said optical network terminating device being made using a different wavelength allocated for said each optical network terminating device, and the communication from said optical network terminating device to said optical multiplexing terminating device being made using plural wavelengths of a smaller number than the total number of said optical network terminating devices connected to said optical multiplexing terminating device and operable in plural different time slot lengths, said optical multiplexing terminating device comprising:

a transmission timing table for storing, for each optical network terminating device ID, a type of uplink wavelength, a start position of transmission time slot, and an end position of transmission time slot;

an allocated byte length table for storing, for each optical network terminating device ID, an allocated byte length indicating data amount permitted to transmit; and a control part for allocating the type of uplink wavelength and the transmission time slot to each optical network terminating device by referring to said transmission timing table and said allocated byte length table;

wherein said control part rearranges in ascending order of allocated byte length for each optical network terminating device ID by referring to said allocated byte length table, and determines order of processes;

selects the type of uplink wavelength in ascending order of time slot length corresponding to the wavelength, for the optical network terminating device ID in ascending order of the order of processes by referring to said allocated byte length table;

compares the time slot length corresponding to the selected type of uplink wavelength with the allocated byte length of the optical network terminating device ID read from said allocated byte length table;

allocates the type of wavelength as a first wavelength type, if the time slot length of the selected type of wavelength is greater than the allocated byte length of the optical network terminating device ID, while on the other hand, allocates the wavelength of which the time slot length is greater than the time slot length of the selected type of wavelength and the time slot length is greater than the allocated byte length of the optical network terminating device ID, as a first wavelength type, if the time slot length of the selected type of wavelength is smaller than the allocated byte length of the optical network terminating device ID;

if all of the allocated byte lengths are allocated within the time slot length in which the transmission time slot is not allocated with the first wavelength type, sets a start position and an end position of transmission time slot, and stores the start position and the end position along with the first uplink wavelength type in said transmission timing table associated with the optical network terminating device ID; and on the other hand, if all of the allocated byte lengths are not allocated within the time slot length in which the transmission time slot is not allocated with the first wavelength type, allocates part of the allocate byte length which can be allocated within the time slot length of the first uplink wavelength type, sets a start position and an end position of the transmission time slot, and stores the start position and the end position along with the first uplink wavelength type in said transmission timing table associated with the optical network terminating device ID, and further, within a time slot length of a second wavelength type of which the time slot length is next greater than the time slot length of the first uplink wavelength type and transmission time slot is not yet allocated, allocates the remaining allocated byte length, sets a start position and an end position of transmission time slot, and stores the start position and the end position along with the second uplink wavelength type in said transmission timing table associated with the optical network terminating device ID.

* * * * *